US010252170B2

(12) United States Patent
Judkins et al.

(10) Patent No.: US 10,252,170 B2
(45) Date of Patent: *Apr. 9, 2019

(54) MULTI SOURCED POINT ACCUMULATION INTERACTIVE GAME

(71) Applicant: Hasbro, Inc., Pawtucket, RI (US)

(72) Inventors: Daniel Judkins, Providence, RI (US); Steve Linker, East Greenwich, RI (US); Andrew Han, Boston, MA (US); Jonathan Pale, Warwick, RI (US); Peter Kullgren, Gloucester, MA (US)

(73) Assignee: Hasbro, Inc., Pawtucket, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/727,914

(22) Filed: Oct. 9, 2017

(65) Prior Publication Data

US 2018/0028920 A1   Feb. 1, 2018

Related U.S. Application Data

(63) Continuation of application No. 14/812,675, filed on Jul. 29, 2015, now Pat. No. 9,814,986.

(Continued)

(51) Int. Cl.
| | |
|---|---|
| *A63F 13/825* | (2014.01) |
| *A63F 13/73* | (2014.01) |
| *A63F 13/69* | (2014.01) |
| *A63F 9/24* | (2006.01) |
| *G07F 17/32* | (2006.01) |
| *A63F 13/213* | (2014.01) |
| *A63F 13/215* | (2014.01) |
| *A63F 13/216* | (2014.01) |
| *A63F 13/85* | (2014.01) |

(Continued)

(52) U.S. Cl.
CPC .............. *A63F 13/825* (2014.09); *A63F 9/16* (2013.01); *A63F 9/24* (2013.01); *A63F 13/213* (2014.09); *A63F 13/215* (2014.09); *A63F 13/216* (2014.09); *A63F 13/69* (2014.09); *A63F 13/73* (2014.09); *A63F 13/85* (2014.09); *A63F 13/95* (2014.09); *A63H 1/00* (2013.01); *G07F 17/323* (2013.01); *G07F 17/3206* (2013.01); *G07F 17/3209* (2013.01); *G07F 17/3216* (2013.01); *A63F 13/46* (2014.09); *A63F 13/67* (2014.09); *A63F 2009/2435* (2013.01); *A63F 2009/2447* (2013.01); *A63H 2200/00* (2013.01)

(58) Field of Classification Search
None
See application file for complete search history.

(56) References Cited

U.S. PATENT DOCUMENTS

| | | |
|---|---|---|
| 3,875,456 A | 4/1975 | Kano et al. |
| 4,493,219 A | 1/1985 | Sharp et al. |
| (Continued) | | |

*Primary Examiner* — Ronald Laneau
(74) *Attorney, Agent, or Firm* — Perry Hoffman

(57) ABSTRACT

Gaming systems and methods for integrated computer-related and physical game play interactions between a game player, a physical game piece and an electronic device are defined. The physical game piece measures motion quantity and transmits motion data using a signal emitter when the signal emitter is actuated. The electronic device receives the transmitted signal, which a game application inputs along with user input. The game application uses the user input and the transmitted signal to tally game player score data in an accumulator.

20 Claims, 9 Drawing Sheets

Related U.S. Application Data

(60) Provisional application No. 62/031,014, filed on Jul. 30, 2014.

(51) Int. Cl.
*A63F 13/95* (2014.01)
*A63F 9/16* (2006.01)
*A63H 1/00* (2019.01)
A63F 13/46 (2014.01)
A63F 13/67 (2014.01)

(56) References Cited

U.S. PATENT DOCUMENTS

| | | | |
|---|---|---|---|
| 4,989,881 A | 2/1991 | Gamble | |
| 5,102,131 A | 4/1992 | Remington | |
| 5,305,013 A | 4/1994 | Daniels | |
| 5,746,602 A | 5/1998 | Kikinis | |
| 5,752,880 A | 5/1998 | Gabai et al. | |
| 5,864,333 A | 1/1999 | O'Heir | |
| 5,947,846 A | 9/1999 | Craig | |
| 5,971,855 A | 10/1999 | Ng | |
| 5,976,038 A | 11/1999 | Orenstein et al. | |
| 6,016,038 A | 1/2000 | Mueller et al. | |
| 6,022,273 A | 2/2000 | Gabai et al. | |
| 6,024,675 A | 2/2000 | Kashiwaguchi | |
| 6,075,195 A | 6/2000 | Gabai et al. | |
| 6,149,490 A | 11/2000 | Hampton et al. | |
| 6,150,774 A | 11/2000 | Mueller et al. | |
| 6,160,986 A | 12/2000 | Gabai et al. | |
| 6,164,973 A | 12/2000 | Macri et al. | |
| 6,184,865 B1 | 2/2001 | Zimmerman et al. | |
| 6,206,745 B1 | 3/2001 | Gabai et al. | |
| 6,213,872 B1 | 4/2001 | Harada et al. | |
| 6,257,948 B1 | 7/2001 | Silva | |
| 6,290,566 B1 | 9/2001 | Gabai et al. | |
| 6,319,010 B1 | 11/2001 | Kikinis | |
| 6,352,478 B1 | 3/2002 | Gabai et al. | |
| 6,356,867 B1 | 3/2002 | Gabai et al. | |
| 6,368,177 B1 | 4/2002 | Gabai et al. | |
| 6,514,117 B1 | 2/2003 | Hampton et al. | |
| 6,544,098 B1 | 4/2003 | Hampton et al. | |
| 6,585,622 B1 | 7/2003 | Shum et al. | |
| 6,773,322 B2 | 8/2004 | Gabai et al. | |
| 6,773,344 B1 | 8/2004 | Gabai et al. | |
| 6,888,322 B2 | 5/2005 | Dowling et al. | |
| 6,959,166 B1 | 10/2005 | Gabai et al. | |
| 6,997,772 B2 | 2/2006 | Fong | |
| 7,190,263 B2 * | 3/2007 | McKay | G08B 13/19602 340/539.1 |
| 7,314,407 B1 | 1/2008 | Pearson | |
| 7,454,002 B1 | 11/2008 | Gardner et al. | |
| 7,862,428 B2 | 1/2011 | Borge | |
| 7,902,840 B2 | 3/2011 | Zachut et al. | |
| 7,927,253 B2 | 4/2011 | Vincent et al. | |
| 7,946,493 B2 | 5/2011 | Havens et al. | |
| 7,993,201 B2 | 8/2011 | Matsumoto et al. | |
| 8,147,322 B2 | 4/2012 | Walker et al. | |
| 8,199,114 B1 | 6/2012 | Jaeger | |
| 8,261,992 B2 | 9/2012 | Havens et al. | |
| 8,272,945 B2 | 9/2012 | Kelly et al. | |
| 8,323,068 B2 | 12/2012 | Ganetakos et al. | |
| 8,337,271 B2 | 12/2012 | Campbell et al. | |
| 8,353,770 B2 | 1/2013 | Lu | |
| 8,358,286 B2 | 1/2013 | Cannon | |
| 8,368,662 B2 | 2/2013 | Argiro | |
| 8,401,343 B2 | 3/2013 | Braun | |
| 8,758,109 B2 | 6/2014 | Lutnick | |
| 8,838,471 B1 | 9/2014 | Shum et al. | |
| 8,903,671 B2 * | 12/2014 | Park | G08B 21/18 702/104 |
| 9,962,615 B2 * | 5/2018 | Lema | A63F 13/825 |
| 2002/0193045 A1 | 12/2002 | Lee et al. | |
| 2004/0248650 A1 | 12/2004 | Colbert et al. | |
| 2005/0227811 A1 | 10/2005 | Shum et al. | |
| 2006/0255149 A1 | 11/2006 | Retter et al. | |
| 2006/0256090 A1 | 11/2006 | Huppi | |
| 2007/0062852 A1 | 3/2007 | Zachut et al. | |
| 2009/0027359 A1 | 1/2009 | Wong et al. | |
| 2009/0048020 A1 | 2/2009 | Gruen et al. | |
| 2009/0115133 A1 | 5/2009 | Kelly et al. | |
| 2009/0118001 A1 | 5/2009 | Kelly et al. | |
| 2009/0124379 A1 | 5/2009 | Wells | |
| 2009/0131134 A1 | 5/2009 | Baerlocher et al. | |
| 2010/0277075 A1 * | 11/2010 | Rees | G01J 1/4204 315/149 |
| 2011/0086692 A1 | 4/2011 | Guziel | |
| 2011/0165933 A1 | 7/2011 | Guziel et al. | |
| 2011/0227871 A1 | 9/2011 | Cannon | |
| 2012/0050198 A1 | 3/2012 | Cannon | |
| 2012/0190455 A1 | 7/2012 | Briggs | |
| 2012/0194457 A1 | 8/2012 | Cannon | |
| 2012/0244939 A1 | 9/2012 | Braun | |
| 2013/0012313 A1 | 1/2013 | Chen | |
| 2013/0017891 A1 | 1/2013 | Romero et al. | |
| 2013/0079139 A1 | 3/2013 | Gray | |
| 2013/0127911 A1 | 5/2013 | Brown | |
| 2013/0130779 A1 | 5/2013 | Gagner et al. | |
| 2013/0181927 A1 | 7/2013 | Madonna et al. | |

* cited by examiner

MULTI SOURCED POINT ACCUMULATION INTERACTIVE GAME

CROSS-REFERENCE TO RELATED APPLICATIONS

This is a non-provisional patent application is a continuation of U.S. patent application Ser. No. 14/812,675 which claims priority pursuant to 35 U.S.C. 119(e) to U.S. Provisional Patent Application No. 62/031,014, filed on Jul. 30, 2014.

FIELD OF THE INVENTION

The present invention relates generally to interactive games, and more particularly to game scenarios such as endless running, point accumulation based videogames used with mobile electronic devices and including further functions for multiple sources for point accumulation. For example, points may be earned from videogame play, mobile device movement, user interactions with a physical toy, friends, and promotions.

BACKGROUND OF THE INVENTION

During the past three decades, videogames have evolved tremendously and have become widely played by people of all ages and abilities. Additionally, recent years have been marked by an explosion in the use of mobile electronic devices, such as smart phones, tablet computers, portable gaming devices and the like. Correspondingly, the popularity of playing videogames on mobile electronic devices has also exploded.

Also in recent years, several prior art videogames, known as endless running games, have become extremely popular. In endless running games, a player begins the game with a certain amount of resources for playing the game, and the game runs until the player exhausts all his or her resources; during the game, the player may increase resource levels through various game play events. Traditionally, these increased resources are earned from within the videogame, for example, by accumulating a certain number of points resulting from videogame play. Thus, the increased resources have been accumulated fully within a virtual environment.

Over the past few decades, systems, devices and methods also have used physical activity measurements as input to computer-related systems, mainly to promote physical activity or particular products. U.S. Pat. No. 8,353,770 to Lu for "Mobile Social Fitness Networked Game" discloses a mobile device where performance data is used for fitness, socialization and potential game playing. Patent application US 2005/0227811 to Shum for "Game Pod" discloses a game pod attachable to footwear that measures physical activity and uses the measurements as input to a videogame. U.S. Pat. No. 6,585,622 to Shum for "Interactive Use an Athletic Performance Monitoring and Reward Method, System and Computer Program Product" discloses a method for rewarding athletic performance involving the use of a product worn by a person. U.S. Pat. No. 6,213,872 to Harada, et al. for "Pedometer with Game Mode" discloses a pedometer with a game mode for a child.

Various sports balls, pucks and the like are known which may contain an electromagnetic transmitter. For example, U.S. Pat. No. 5,976,038 to Orenstein et al. for "Apparatus for detecting moving ball" issued Nov. 2, 1999 discloses an apparatus having a game ball containing a transmitter where antennas are provided for determining whether or not the game ball has passed over a line. Orenstein et al. allows for limited user interaction with illuminating sensors that increase the interactive capabilities of the game. Similarly, the U.S. Pat. No. 5,947,846 to Craig for "Hockey Goal—'The Judge'" issued Sep. 7, 1999 describes a hockey apparatus where sensors detect whether a puck has passed over a housing line. Like Orenstein et al., the Craig patent allows for some user interaction by way of reaction to a puck crossing the line as real-world physical play activities. U.S. Pat. No. 5,864,333 to O'Heir for "Foot Force Actuated Computer Input Apparatus and Method" discloses using shoes, pads, or other similar device to generate control signals corresponding to movement. U.S. Pat. No. 6,024,675 to Kashiwaguchi for "Data-Using Game System" discloses using operational training data produced from a device such as an exercise machine as input for a videogame that is part of the exercise machine.

U.S. Patent Application No. 2013/0017891 A1 to Romero, et al. for "Systems And Methods For Providing Virtual Incentives For Real-World Activities" published Jan. 17, 2013 discloses toys and physical play objects such as sports balls or flying disks that include a sensor to generate signals conveying information regarding the amount of real-world physical play activities performed with the associated object. Romero discloses that once the amount of play crosses a threshold level, its user may be presented with a code, from which the user may redeem virtual benefits and incentives for use in virtual-world videogame environments such that real-world physical activity is encouraged through virtual space benefits.

Because the play of videogames has largely been fueled with energy, or points, earned or otherwise accumulated from within the virtual environment of the played game, the enjoyment of the game has been limited. It would be advantageous to enhance the enjoyment of videogames by providing the endless running virtual videogame with enhanced alternate sources for accumulating the virtual resources used to power the game in the virtual environment, as well as by providing toys, sports balls, disks and other real-world physical play objects with real-world feedback and indicators. Accordingly, it would be desirable to provide a mobile electronic device based endless running videogame application that accumulates points or other similar virtual energy used to power the videogame from both the virtual environment and the real environment. This can be accomplished by producing activity related data from an external real environment or virtual environment source and communicating that activity related data to the virtual environment of the endless running game and using that activity related data to produce the points or virtual energy needed to fuel the endless running game. The inventions discussed in connection with the described embodiments address these and other deficiencies of the prior art.

The features and advantages of the present inventions will be explained in or apparent from the following description of the preferred embodiment considered together with the accompanying drawings.

SUMMARY OF THE INVENTION

The present inventions address the deficiencies of the prior art by defining an endless running videogame based game ecosystem for use on a mobile electronic device that, in addition to generating points in a traditional manner within the virtual environment, captures play in the real world to store and to use as points, or other virtual resources, within a virtual environment. For example, in the described embodiments, an endless running videogame running on a mobile electronic device that allows a player to play continuously as long as the player earns points playing the game is enhanced to allow the player to earn points by creating input from real environment activities, such as by scanning a code on a physical object or by producing activity related data from athletic activity. Thus, unlike the prior art, a virtual environment based endless running videogame is enhanced by allowing a player to earn and accumulate virtual environment power resources, such as points, not only in the virtual environment, but also through real world activity. Embodiments include a gaming ecosystem consisting of a digital game and physical toy band, where the "life" or "energy" of the user's digital character, or avatar, is "charged" through a digital translation of the physical game play. The avatar/character in the digital world may continue to play digital games and progress accordingly. This type of game ecosystem is not known to exist in the prior art.

Described embodiments of the present inventions define a gaming ecosystem including a videogame application running in a virtual environment on a mobile electronic device wherein the object is to earn and accumulate points by including further functions with multiple sources for point accumulation. Points power the game running in the virtual environment. The physical toy may have a light that indicates the state of the toy by color and that provides toys, sports balls, disks and other real-world physical play objects with real-world feedback and indicators. Further points may be earned not only within the videogame, but also from activities in the real world, combined with activities where points earned in the real world may be transferred to the virtual environment for accumulation and use derived from a scoring algorithm. In essence, the game is powered by play. The game may be downloaded from places such as iTunes™ and Google™.

In described embodiments, a player may earn and accumulate points three main ways: 1) by playing a videogame in a virtual environment on a mobile electronic device; 2) by wearing gear, such as a wristband, and producing activity based data, which gets converted to points and transferred to the videogame; and 3) by using physical toys that may be scanned or that create points when used. Additionally, initial starting points may be obtained in a defined manner, for example, once the videogame is started for the first time, the user may shake the mobile electronic device as a 10-second timer runs to earn 100 points and to unlock the videogame.

When playing the videogame in the described embodiments, the player may collect points by running within the game, by completing challenges, by overcoming obstacles and by defeating antagonistic characters. When wearing gear, such as a wristband, the point-earning activities may involve activities using the gear without the videogame as well as activities using the gear along with the videogame. For example, with a wristband, a player may earn points by wearing the wristband and having the wristband track the player's physical play all day. A certain amount of time of activity may equal a certain number of points. A player may also get points by discovering new challenges for using the wristband and new games to play with the wristband. A player may obtain bonus points by getting others involved in a multi-player game and more points for winning. A player may obtain further points by syncing the wristband with the videogame application.

Described embodiments may include playing with physical toys within the game ecosystem to earn points. In these embodiments, for example, a player may earn points by scanning a card with a code that comes with a physical toy. A player may also earn points by playing with physical toys such as sports balls that are used to accumulate points when in use, and that signal the player to transfer points from the physical toy to the virtual environment when the physical toy point storage is full. The physical toys, balls and the like may be repeatedly used to earn points multiple times. The physical toy includes a light or other indicators that communicate the state of the toy by color, thus providing toys, sports balls, disks and other real-world physical play objects with real-world feedback and indicators. For example, a player may press a button and the light may appear red to indicate that no points are available. The light may appear yellow to indicate that some points have accumulated but are not ready for transfer, and green may indicate that the point storage is full and ready for transfer. In certain embodiments, players may be rewarded by earning points for physical toys previously purchased.

Various embodiments allow a player to earn points by providing information to prospective merchants and others willing to exchange points. This way, merchants may advertise their products within the game ecosystem. Additionally, players may access a website, both within the game ecosystem and outside the game ecosystem, to make videogame related purchases and perform other videogame related activities.

Moreover, within the game ecosystem, some embodiments have a store in the virtual environment, where a player may spend accumulated points to turn points into power. A player may exchange points for such things as new characters, character outfits, new character skins, theme related content such as for holidays and for big events, such as Christmas, the Olympics, etc., consumable power-ups, gadgets for use in the virtual environment, in-game companions, new game levels, accessories such as funny helmets with antlers, special power gear, sports related items, pets, environments, etc. For example, a player accumulates a certain number of points through physical activity with one of the toys, such as one of the sports balls. The player will then have an option within the game to spend these points towards a specific skill, accessory, level, and more to better his or her progress in the game.

Some embodiments will have a statistics page within the virtual environment. The statistics page may show information such as the amount of power stored, the number of points earned, an indication of how well a player plays, trophies, badges, etc. This information may also be stored in the Cloud or via some similar manner so that one player's statistics and information may be viewed and compared with other players' information via the web if IDs are exchanged properly. A player may create teams and play multi-player games within that player's game ecosystem.

BRIEF DESCRIPTION OF THE DRAWINGS

The inventions will now be more particularly described by way of example with reference to the accompanying drawings, the advantages of which may be best understood with reference to the following detailed description taken in conjunction with the drawing figures, in which.

Figure 1:
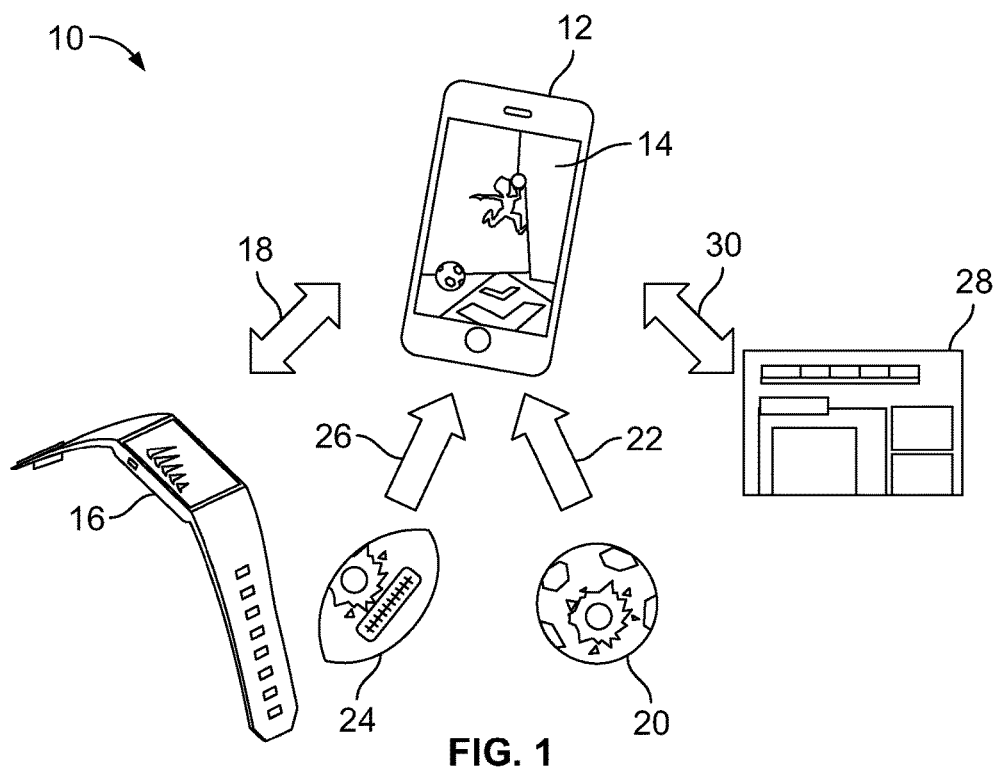
FIG. 1 shows a high-level diagram illustrating the overall functionality of the multi-sourced point accumulation interactive game system and the directional communication between the real and the virtual environments.

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

DETAILED DESCRIPTION OF THE EMBODIMENTS

A described embodiment is a game ecosystem with several components. The game ecosystem and its advantages may be understood by the following detailed description of various elements of the system taken in conjunction with the accompanying figures.

Embodiments include gaming systems and methods for integrated computer-related and physical game play interactions having a physical game piece and an electronic device. The physical game piece may be a wristband or a sports ball or the like. The electronic device may be a tablet computer or a smart phone or the like.

The physical game piece includes a motion detector to measure motion quantity and a signal emitter that communicates with the motion detector and emits one or more signals where each signal relates to a measured motion quantity. For example, the signal emitter may consist of three LEDs, one red, one yellow, and one green, where the LED lights red when the motion detector has not detected any motion, yellow when the motion detector has detected 1 to 100 movements, and green when the motion detector has detected more than 100 movements. An actuator, such as a button, is coupled to the signal emitter to actuate the signal emitter.

The electronic device includes a receiver that receives the signals emitted from the signal emitter, a user input interface, and a game application. The game application may be an endless running game. The game application uses a score accumulator to tally various types of player's scores. A first program in the game application receives input from a user input interface and sends score data of the one or more score types to the score accumulator for the score accumulator to tally based on the pattern of user input and the score type. A second program module in the game application uses the receiver to input the signals emitted from the signal emitter and then sends score data of the one or more score types to the score accumulator for the score accumulator to tally based on the pattern of the received signals and the score type.

The game application may include the first program module further having a plurality of sequentially accessible gaming program modules such that a game player may accumulate a game score with respectively sequential levels of increasing difficulty.

A multiplier program module may be used to receive score data from the first program module and the second program module, multiply one or more of the difficulty level and the score data by a predetermined multiple based on the quantity and pattern of input from the first program module and the second program module. The multiplier program module may then communicate the resultant multiplication to the score accumulator. In fact, in some embodiments, the score accumulator communicates only with the multiplier program module. In further embodiments, the receiver is a camera, and the second program module is configured to receive a scanned code from the camera and to send a predetermined pattern of input to the multiplier program module.

In some embodiments where the receiver is a camera, the signal emitter consists of one or more light-emitting diodes plus some type of transmitter that transmits non-visible electronic signals. In some embodiments, the actuator is a button that a game player presses to actuate to cause the signal emitter to emit a signal. The one or more signals emitted by the signal emitter each cover a range of measured motion quantity, and, in some embodiments, the signal emitter sets the measured motion quantity to zero upon actuation when the measured motion quantity has reached a defined amount.

For some systems and methods described, a currency redemption program module can communicate with the score accumulator and the user input interface and receive input from the user input interface to allow the player to make purchases of virtual resources and tangible products and to direct the score accumulator to adjust the tallies of the one or more game player scores of the one or more respective score types based on the pattern of user input. In some instances, the currency redemption program module requires the player to make a purchase when the one or more of the tallies of the one or more game player scores of the one or more respective score types reaches a predefined amount.

In some embodiments, a virtual character that is related to the physical game piece is used as a character in the game application. In this case, the first program module may be configured to accept user input defining the physical game piece used, and the second program module may be configured to accept further input defining the physical game piece used. The game application may be configured to use virtual energy to power the virtual character and to use an amount of virtual energy directly related to the amount of accumulated score data of the one or more score types.

In some systems and methods, a network with a network access interface may be configured to store player account information on a server and to allow access to the network from the web and from other smart devices to show the player's game accomplishments and to compare the player's game accomplishments with game accomplishments of one or more other players.

A main element of the described game ecosystem involves playing the digital game. The digital game may be a downloaded app installed on compatible smart devices. The digital game may consist of several elements, including: 1) a dashboard of an avatar's energy meter, charged from a smart device or from physical product game play, and progression status; 2) an endless running game where the avatar must progress within the game as far as possible; and 3) power-up options that may be charged or allocated from an avatar's total energy.

The power-up options may include faster running, higher jumping, a stronger avatar, etc. Game progression will be limited by the amount of energy stored in the game. A player's energy level decreases to a set limit whenever the player's avatar hits an obstacle and/or runs out of the stored energy as reflected in the avatar's meter. The current run may end when the player runs out of energy. However, at the end of each run, a player may choose to continue using in game currency or power-ups. The game will end when a user runs out of energy and chooses to no longer prolong the run using currency or power-ups.

The app alone will allow a player to charge and increase the player's energy level during play. However, when a player uses the physical products, the player will charge the avatar's energy more quickly. Additionally, physical products in the ecosystem can unlock other features within the digital game, such as allowing accelerated access to mini-games.

As noted, using physical toy products and balls within the game ecosystem accelerates charging energy. For the wristband mentioned above, a single player will charge an avatar's energy by playing games as directed from the app or from instructions, such as by engaging in timed physical play while wearing the wristband, by playing Nerf™ hoops, etc. In some embodiments, the wristband will display a player's energy status via an LED when the player pushes a button on the band. For multi-player games, each player with a wristband will have their avatar's energy charged during game play.

Physical toy products may also include enabled, or connected, products, as well as powered products. Enabled, or connected, products do not include sensors and are used to connect the physical toy product to the app by using the camera on the smart device to capture a two-dimensional printed, scannable code. This code will be deciphered to identify the specific physical product and then to increase energy at a proper rate. In some embodiments, the app on the electronic device will provide visual and/or audio feedback during a scan. Additionally, promotional bonus multipliers may be administered through the app during certain time periods.

Powered products include sensors. During regular, intended use of a powered product, a sensor, such as a jiggle switch or the like, allows remote accumulation of raw activity. In a described embodiment, the powered product will contain a multicolor LED that will change color to indicate fullness level at certain thresholds, for example red/yellow/green to represent lowest to highest level of collected energy respectively. Upon reaching the highest level, the powered product LED may not change until prompted to transfer energy through the camera on a smart device. The powered product and the app may use a common protocol that may involve blinking the LED on and off to communicate that the highest level was reached, and to convert to the appropriate energy value. Other protocols may be used.

Communications with some physical toys during game play occurs between and among the physical toy, the app and the user. When a player uses the app and wears the wristband, the wristband will communicate with the smart device via Bluetooth™ or some similar protocol. The app will communicate with the player by suggesting different games to play while wearing the wristband, such as missions and challenges. The app will provide the challenges and/or missions to be played with the band. For example, a challenge could be a time challenge where the band wearer needs to move a certain amount in a set period of time. This communication may also be used to synchronize multiple bands for a multi-player challenge. These challenges or missions may be added with firmware updates.

The powered products communicate with the app by the app using the camera to decipher the blinking LEDs on the powered product. Other communication methods are possible. For example, Zappar™ Zapcodes™ may be used for image recognition to identify the powered product. The non-powered products will come with a scannable code or other image that can be scanned by the app to unlock a digital version or a fantasy version of that product. The scannable code or other image may be on the package or on a printed sheet. The scannable code or image must only be scanned once and then discarded because the fantasy, or virtual, version of the product will be permanently unlocked.

An example of a powered product includes a line of tech-enhanced toys that allow the player to earn points through physical play and apply those points as currency for virtual upgrades in the electronic device game app. There is an electronic module added to the product with a motion sensor, single button and LED which changes color to tell the player if the toy is 'Empty', 'Half-Full', or 'Full'.

The product starts 'Empty' and must be filled with points. Each product has a set number of points it is worth when it is 'Full', i.e. 1000 points. The number of points a product is worth in the game is relative to the retail value of the toy, e.g., a $14.99 toy=1000 points, a $19.99 toy=2000 points. These points can be added to the player's game app only when the product is 'Full'. The app uses the main camera of the mobile device to 'scan' the product when it is Full and add the points to a virtual bank within the game. These points may then be used to purchase virtual items such as game levels, avatar upgrades or vanity items that may be applied to the avatar. After the points have been added to the game, the toy is Empty again and may be refilled with points.

The game flow proceeds as follows: 1) the Player presses the single button on the product and the LED flashes red, indicating the product is empty; 2) as the Player plays with the toy physically, the sensor counts the number of times the sensor detects motion. The chip inside the module uses an algorithm that translates the number of times the sensor detects motion to one of 3 states for the toy, Empty, Half-Full and Full; 3) if the player presses the button again during play, the LED may flash yellow, indicating the toy is Half-Full; 4) if the player presses the button and the LED flashes green, this indicates that the toy is Full and ready to transfer the points to the app; 5) to transfer the points from the toy to the app, the player must activate the app and go to the menu item called 'sync'; 6) the camera on the mobile device is ready to gather the points; 7) the app tells the player to point the camera at the toy and press and hold the button on their toy for 3 seconds to start the transfer; 8) if the player presses and holds the button, the GREEN LED will flash with a pattern that identifies it to the app as an energy-holding toy, the type of toy and the point value; 9) this pattern repeats for 45 seconds and cannot be interrupted; 10) if the app sees the full pattern once, it alerts the player that points have been collected and will ignore any other flashes from the toy; 11) if the app does not see the full pattern, it does not collect the points; and 12) after 45 seconds, the toy returns to the Empty state and is ready to be filled again.

A player may achieve extended and accelerated energy progression from combined use of the various physical products using multipliers and methods as described below. Energy may also be converted to power-ups and special items and also be used to unlock special features of the app or to allow special access to parts of the app.

In the described embodiments, all progression status information within the videogame may be stored in a user's account via various servers. The app and web dashboard will be able to display progression status of any player who logs in. Friends will be able to see the status of each other.

Also in the described embodiments, different types of currency may be used. One type of currency may be derived from the physical products and scoring algorithm as well as internally in the app. This type of currency may only be converted to digital items such as power-ups, special items, upgrades, unlockable levels, etc. This type of currency may never be converted to another currency. Another type of currency may be derived from accomplishment and progression within the digital game. Other possible currency types may include 1) a one-time added predetermined amount of currency from scanning physical products and 2) currency acquired from converting energy stored in a physical toy or from converting a different type of currency.

The player will level up during game play. Leveling up will give the avatars more in-game abilities and better attributes, including the total number of energy cells. Energy cells are treated like in-game batteries for the total energy being stored. The HUD of the energy bar will display the additional cells that have been earned through game play. In a described embodiment, four additional cells besides the default cell may be used for a total of five cells.

In some embodiments, the physical band will also level up to evolve based on the player's level. The band will also start with one cell and can level up to a total of five cells. When the band is synced with the app, the app will set the level of the band. Each time the band cells are filled, the band may play a unique audio sound. The leveling up of both the user and the band may be tunable and updatable variables.

Accumulating energy points may depend on multiple factors, which the app may calculate. Energy point accumulation may also use a system of tunable variables to create game balance between videogame and physical toy play that provides the greatest rewards to players. The app will be supported by backend servers that contain the different variables for tuning and balancing the accumulation of energy. The variables are also needed for the addition of any new physical products that will be connected to the app. Thus, the app could have several million players creating tons of data used to then tune and re-tune the game. The number of players and hours spent playing will far outnumber the possible hours of game play testing that could happen by the development and publishing test teams.

FIG. 1 shows a high-level diagram illustrating the overall functionality of the multi-sourced point accumulation interactive game system and the directional communication between the real and the virtual environments. The game system 10 centers around an electronic device 12, such as a smart phone or a tablet computer or other similar device, and a videogame app 14 running on the electronic device 12. The videogame app 14 shown requires virtual energy to run and may acquire virtual energy from multiple sources. One source includes a wristband 16, which includes a motion detector to measure motion quantity, a signal emitter to transmit measured motion quantities, and an actuator to cause the signal emitter to transmit. The wristband 16 allows bidirectional communication 18 between the wristband and the videogame app 14 through the electronic device 12. Thus, the wristband 16 sends motion related data to the videogame app 14 through the electronic device 12 and may also be equipped with a receiver to receive signals from the videogame app 14 through the electronic device 12. These signals may provide visual, auditory or other feedback to both the wristband 16 and the player wearing the wristband 16.

Also in FIG. 1, a powered sports ball 20 is shown with unidirectional communication 22 to the videogame app 14 through the electronic device 12. Like the wristband 16, the powered sports ball 20 includes a motion detector to measure motion quantity, a signal emitter to transmit measured motion quantities, and an actuator to cause the signal emitter to transmit. Thus, the powered sports ball 20 sends motion related data to the videogame app 14 through the electronic device 12, where the motion related data gets translated to videogame app 14 energy. The powered sports ball 20 shown uses unidirectional communication 22 and cannot receive any signals from the electronic device. In a described embodiment, powered sports ball 20 may have three different color LEDs, red, yellow and green, and an actuator button that causes one LED at a time to light. The LEDs may indicate the amount of stored motion data, such as red for empty, yellow for more than empty but less than full, and green for full. Simultaneously, a camera on the electronic device 12 communicates with the videogame app 14 and detects which LED is lit through the unidirectional communication 22. When an LED indicates that the powered sports ball 20 is full, the videogame app 14 increases the energy needed to continue playing the videogame app 14. The powered sports ball 20 may also sense when it is full and reset itself so that the red LED will show.

Further in FIG. 1, an enabled sports ball 24 is shown with unidirectional communication 26 to the videogame app 14 through the electronic device 12. Unlike the wristband 16 and the powered sports ball 20, the enabled sports ball 24 does not sense motion, emit signals, or have an actuator. Rather, the enabled sports ball 24 contains a scannable code, such as a QR code, a Zappar™ Zapcode™, or a Microsoft™ Tag™ code, that may get scanned by a camera on the electronic device 12 and recognized by the videogame app 14. Once the videogame app 14 recognizes the scanned code, the videogame app 14 increases the energy needed to continue.

Finally in FIG. 1, the videogame app 14 may communicate through the electronic device 12 with an Internet webpage 28 using bidirectional communication 30 to allow a player to track his or her progress and to compare that progress with other players. The Internet webpage 28 may also be used to purchase both physical and virtual items both in-game and outside the game environment.

Figure 2:
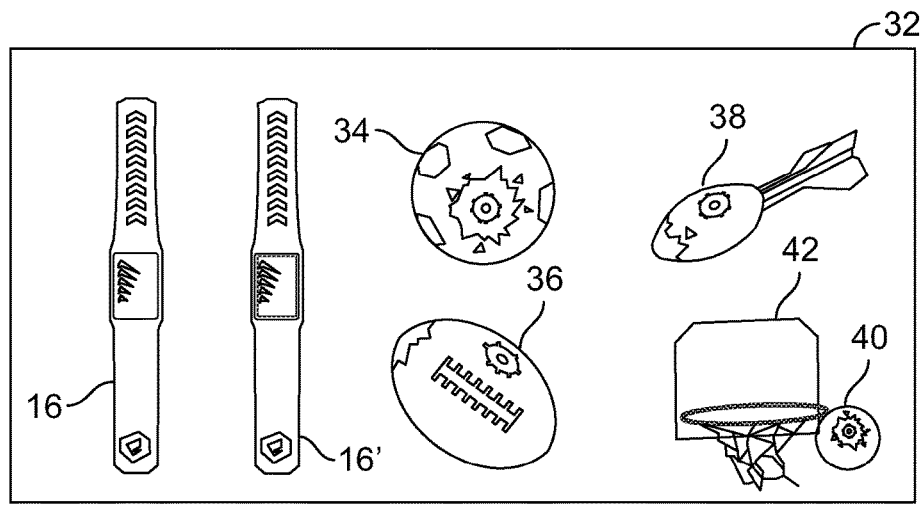
FIG. 2 shows wristbands and physical toys that produce activity based data.

FIG. 2 shows wristbands and physical toys that produce activity based data. The physical game piece collection 32 includes several physical game pieces that the videogame app 14 from FIG. 1 recognizes using the camera on the electronic device 12 in FIG. 1. Although a fixed number of items are shown in FIG. 2, this figure is not meant to limit the items that the videogame app 14 will recognize. The physical game piece collection 32 displays the wristband 16, a wristband 16', a soccer ball 34, a football 36, a vortex football 38, and a basketball 40, all which the videogame app 14 may recognize. In the current example, the basketball hoop 42 is not an item that the videogame app 14 will recognize, however, because the videogame app 14 will recognize the basketball 40, the videogame app 14 may assume that the basketball hoop 42 is used. Consequently, for the soccer ball 34, the football 36, the vortex football 38, and the basketball 40, the videogame app 14 will recognize which physical game piece the player uses and may adjust the virtual environment accordingly. For example, if the videogame app 14 is an endless running game with alternate paths or available mini-games, then, when a player uses the vortex football 38, the videogame app 14 will offer the player a chance to play a videogame featuring a virtual vortex football.

The wristband 16, on the other hand, may not relate specifically to a particular sport, but provides a versatile way for a physical object to interact with a virtual environment. For example, the videogame app 14 may involve a combination of virtual play and physical play and may, after a certain amount of virtual play, challenge the player to perform a timed challenge involving a calculable amount of motion that does not use any moving sporting equipment. The wristband 16, as described, can measure the amount of player movement during the challenge and communicate movement data to the videogame app 14. In response, the videogame app 14 may inform the player whether he or she won or lost the challenge and may send a signal back to the wristband 16 to reset the motion detector to a zeroed state.

Furthermore, a plurality of wristbands, such as the wristband 16 and the wristband 16', may be used to communicate with each other and with the videogame app 14 to allow multiplayer game play. For example, the videogame app 14 described above may challenge a player to use the wristband 16 to compete in a multiplayer game where each player must create as much motion data as that player can in a set period of time. The challenged player's wristband 16 will record its own motion data and communicate with the wristband 16' (and all other wristbands in the plurality of wristbands) to record the motion data produced by the wristband 16'. The wristband 16 may then communicate with the videogame app 14 to convey information about the winner, as well as information about all other players. The wristband 16' may also communicate directly with the videogame app 14.

Figure 3:
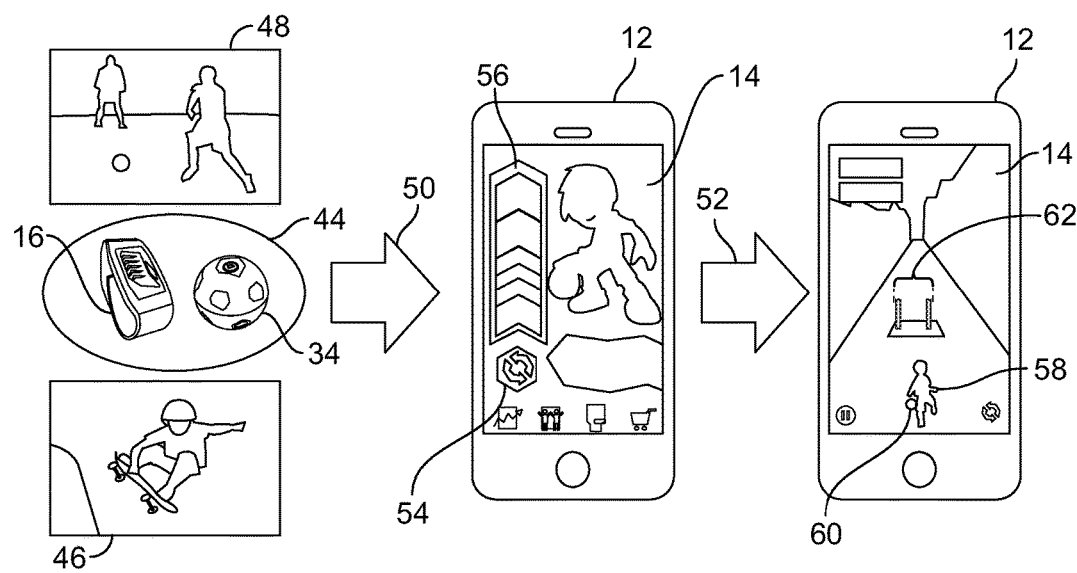
FIG. 3 shows players using the band and a sports product to create activity based data and converting the activity based data into videogame resources.

FIG. 3 shows players using the band and a sports product to create activity based data and converting the activity based data into videogame resources. The available physical game pieces 44 include a wristband 16 and a soccer ball 34. Although the available physical game pieces 44 do not include a skateboard, the skateboarder 46 shown may use the wristband 16 to create motion data to send via unidirectional communication 50 to the videogame app 14 on the electronic device 12. Following the unidirectional communication 50, the videogame app 14 processes the motion data using a program module that quantifies the motion data and that converts the motion data to usable virtual energy and sends the virtual energy to a program module controlling the gaming portion of the videogame app 14 using unidirectional communication 52. The videogame app 14 notifies the player when the conversion occurs using a moving energy conversion indicator 54 along with the conversion progress using an energy conversion meter 56. Once the converted energy is transferred via the unidirectional communication 52 to the program module controlling the gaming portion of the videogame app 14, the virtual character 58 will have replenished resources to use in the videogame app 14.

In some instances, for example when the player is a skateboarder 46 and the videogame app 14 does not have a virtual skateboard for use within the game, the physical skateboard is not recognizable to the videogame app 14, and the virtual character 58 simply acquires more energy-type resources. In other instances, for example when the player is in a soccer game 48 using a recognizable physical toy, such as a soccer ball 34, the videogame app 14 will recognize the soccer ball 34 and provide a virtual soccer ball 60 for the virtual character 58 to use during the run along with increased virtual energy-type resources. The videogame app 14 may also recognize the virtual soccer ball 60 and add virtual soccer goal posts 62 to the run. The virtual character 58 may then try to kick the virtual soccer ball 60 between the virtual soccer goal posts 62 to gain further points or other virtual resources.

Figure 4:
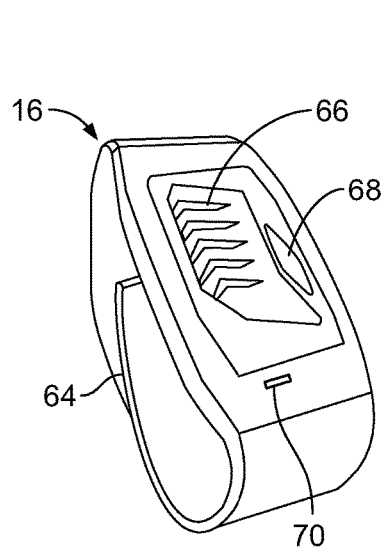
FIG. 4 shows a perspective view of a wristband.

FIG. 4 shows a perspective view of a wristband. The wristband 16 has an adjustable strap 64 to fit wrists of many sizes so that the wristband 16 may be used by players of many ages and sizes. The wristband may be equipped with a rechargeable battery and wireless communications capabilities such as Bluetooth or something similar. The wristband 16 shown has an LED meter 66 to display levels of various things depending on the display mode. The various display modes may include battery charge level, wireless signal strength, stored energy data level, and other measured quantities. A player may use the LED mode button 68 to change the quantity that is displayed. The wristband 16 may further have a micro USB port 70 for such activities and battery charging and communicating with an electronic device.

Figure 5A:
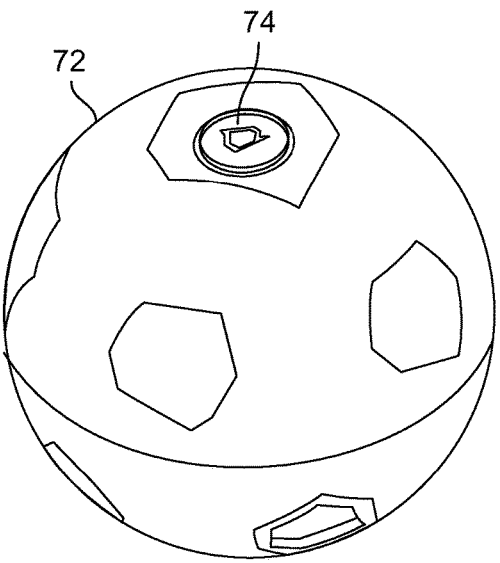
FIG. 5A shows a view of a sports ball that can store motion data.

FIG. 5A shows a view of a sports ball that can store motion data. The sports ball 72 shown is a soccer ball and contains a motion detection unit 74 that measures the quantity of motion that the sports ball 72 experiences. The motion detection unit 74 further has a signal emitter to transmit the motion data so that a smart electronic device may receive it and use the data within an app. In the figure shown, transmission from the motion detection unit 74 is actuated by pressing the motion detection unit 74 into the sports ball.

Figure 5B:
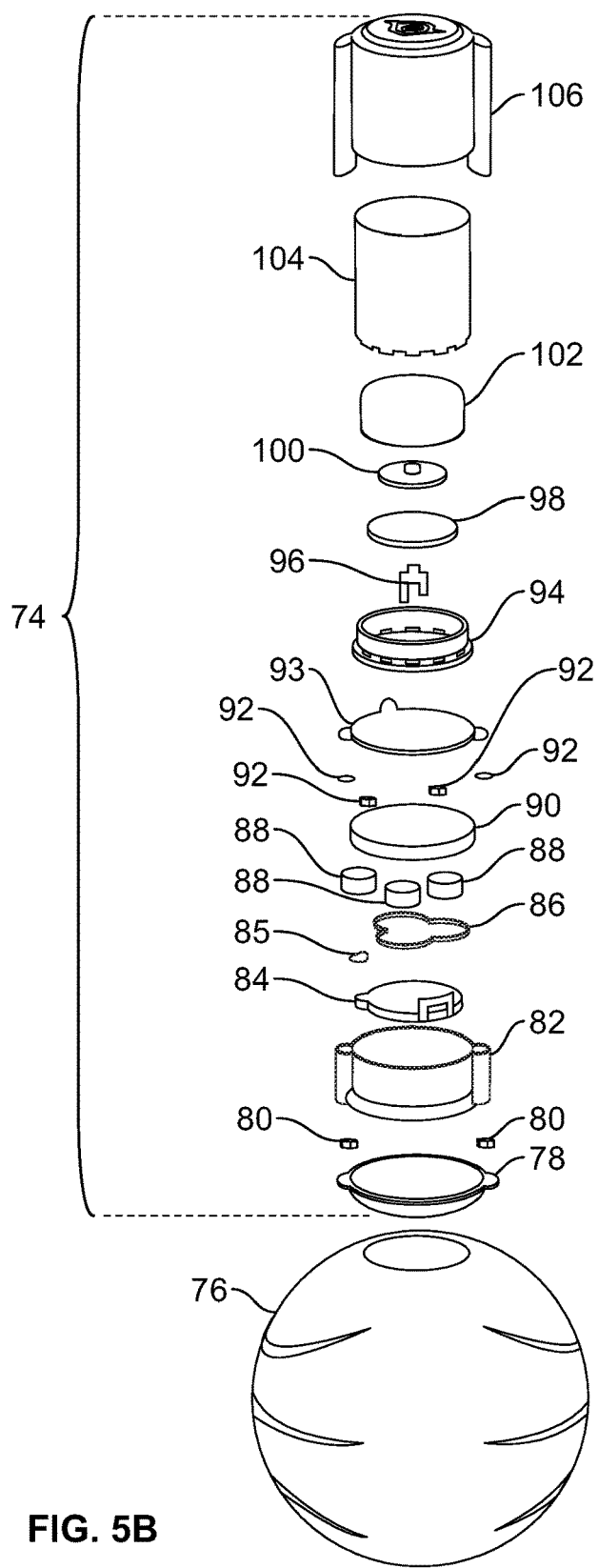
FIG. 5B shows an exploded view of the sports ball shown in FIG. 5A.

FIG. 5B shows an exploded view of the sports ball shown in FIG. 5A. The sports ball skin 76 can be a typical inflatable soccer ball, or other mobile sports object, modified to hold the motion detection unit 74. The motion detection unit 74 in the described embodiment is made from several parts shown in FIG. 5B and may be assembled from the bottom up and inserted into the sports ball skin 76. Such assembly includes a supporting lower foam insert 78 held to an upper foam insert 82 using suitable nuts 80. A battery mechanism fits into the lower foam insert 78 and the upper foam insert 82 and consists of a battery door 84, a washer 85 and O-ring 86 placed onto the battery door 84, and button cell batteries 88 situated within the inner edge of the O-ring 86. The button cell batteries 88 are then covered by a battery box 90 that fits snugly on top of the button cell batteries 88. The battery mechanism is then closed by fastening the battery door cover 93 to the battery door 84 with nuts 92. The battery mechanism is then abutted with a cover assembly supported by a cover insert 94. A rubber key 96 is then placed into the cover insert 94 and between the battery door cover 93 and a printed circuit board 98 so that the button cell batteries 88 will power the printed circuit board 98 when pressed together. The remainder of the cover assembly includes a button 100 placed into an inner cover 102, then placed into a top cover 104, then placed into an outer cover 106.

In sum, all these pieces are coupled together to form the motion detection unit 74 and placed into the sports ball skin 76 so that the top surface of the outer cover 106 is flush with the ball skin 76 surface. In use, the printed circuit board 98 contains the circuitry to measure the sports ball motion and when a player presses the motion detection unit 74 towards the sports ball skin 76 center, the stored motion data is transmitted.

Figure 5C:
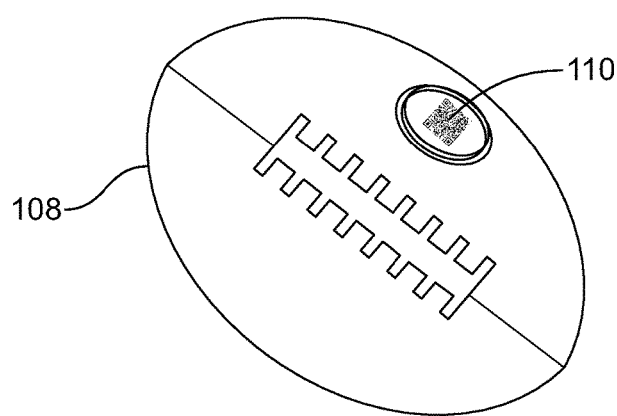
FIG. 5C shows a view of a sports ball with a scannable code.

FIG. 5C shows a view of a sports ball with a scannable code. The sports ball 108 shown does not have the circuitry just discussed but is identifiable by the scannable code 110 on the surface of the sports ball 108. This sports ball 108 further does not have any means to measure movement. Thus, this sports ball 108 is considered enabled, rather than powered, as discussed above. Rather than the videogame discussed above receiving LED signals through the camera, or non-visual signals through another receiver, the camera on an electronic device 12 discussed above is used to scan the scannable code 110, and the videogame app 14 discussed above recognizes the sports ball 108 by its scannable code 110 and increases the energy in the videogame app 14. Depending on the embodiment, the scannable code 110 may be scanned once, periodically, or randomly. The scannable code 110 may be any scannable code, such as a QR code, a Zapcode™ by Zappar™, Microsoft™ Tag™ codes, a bar code, and the like.

As an example of a described embodiment, a game based on the Nerf™ product line and referred to as Energy™ provides a videogame app on a mobile electronic device based on an endless running game concept and fueled not only by videogame play, but also by the energy of real life play and activities. The game motivation system is designed to create game play loops and rewards that interact between the virtual world of a videogame and the real world activities performed with the Energy™ products, such as wristbands, balls and special cards. The game variety and replay value is rich and also offers a micro-transaction shop for users who wish to spend accumulated energy and add depth to their game, gain an extra edge, or further personalize their experience.

Examples of described embodiments of the game may have the several game features as follows, although other embodiments may have differing numbers of the listed features or different features altogether. For example, the videogame may present two playable characters where each character has two possible states, or modes, normal mode and power mode, each which change the character and the respective virtual environment. A game player may customize each character's equipment, appearance (aesthetics), and behaviors. The game also may use several projectile toys, including a basketball, a football, a soccer ball, or a Nerf™ Vortex™ football. Although the following may vary, the videogame portion of the described embodiment further features: 1) 26 unlockable character skills; 2) 22 items of head gear equipment; 3) 6 consumable "booster" items; 4) 3 companion creatures; 5) a procedural level generator that creates a different track for every game played; 6) 7 environments; 7) 40 pieces of track; 8) 40 game play ingredients; 9) 3 sport exotic game play with basketball, soccer and football currencies; 12) integrated play that allows a player to transfer energy from a real wristband or toy to the videogame; and 13) in app purchases. This list is not exclusive, and other features may be available.

The described embodiments will have a stress factor to motivate the game player. The stress factor that pushes the player forward justifies why he is running. The described embodiment may be a figurative story built from a brand's tagline, for example, "Nerf is forward, Nothin' is behind, don't stop running!" Using shader technology in Unity™, for example, the world behind the player may be "deconstructed" as he is running forward in the videogame.

In the described embodiment, the Nerf or Nothin' concept is presented in the introduction cut-scene at the beginning of every game, and constitutes the main feedback to indicate when the player has taken a hit or whenever the game is over. At the same time, it also justifies that with every new game there is a new track, as the previous one is always annihilated by the Nothin'.

As an example, one may imagine a big black beast running after the main character in a temple run. Whenever a player takes a hit, the beast appears running behind the player for a moment, until the player outruns it once more. If the character fails, the beast will dance beside the character's corpse.

In the described embodiments, when the character takes a hit, cracks appear, the road rumbles and road pieces fall under the player's feet, which is very intense. It does not affect the game play but creates tension for the player. When the game ends, the Nothin' catches up with the player and deconstructs the road, leaving the player falling down a void.

Features of the described embodiment may include the following, for example: 1) a mesh deconstruction shader; 2) overlay crack texture, which can be displayed progressively; 3) rumbling; 4) dust particles; 5) fleeing birds; 6) falling buildings; and 7) tilting light posts.

In the described embodiments, the game itself is a very smooth and flexible runner action game with a deep system of progression and upgrades to keep the players engaged. With simple touch controls, the character is capable of a wide variety of actions, including jumping, dashing, slamming and shooting. Further, the system generates a different playfield for every game. The player can make the character dash in the streets and on the walls, perform half pipes, loop, corkscrew and ride slopes. A standard game session can last from 1 to 10 minutes on average, or more for more highly skilled players. In the described embodiment, game dwelling time often occurs outside of the core game play and in the reward system. The total length of the game is intended to vary and range from 4 hours on average to 15 or more hours for completionist players.

The described embodiments may also include an economy system in the videogame. First, the videogame offers four types of resources for the player to use during their game experiences. These 4 resources are: 1) Energy; 2) Sparks (soft currency); 3) Stars (hard currency); and 4) real money.

Figures 6, 7:
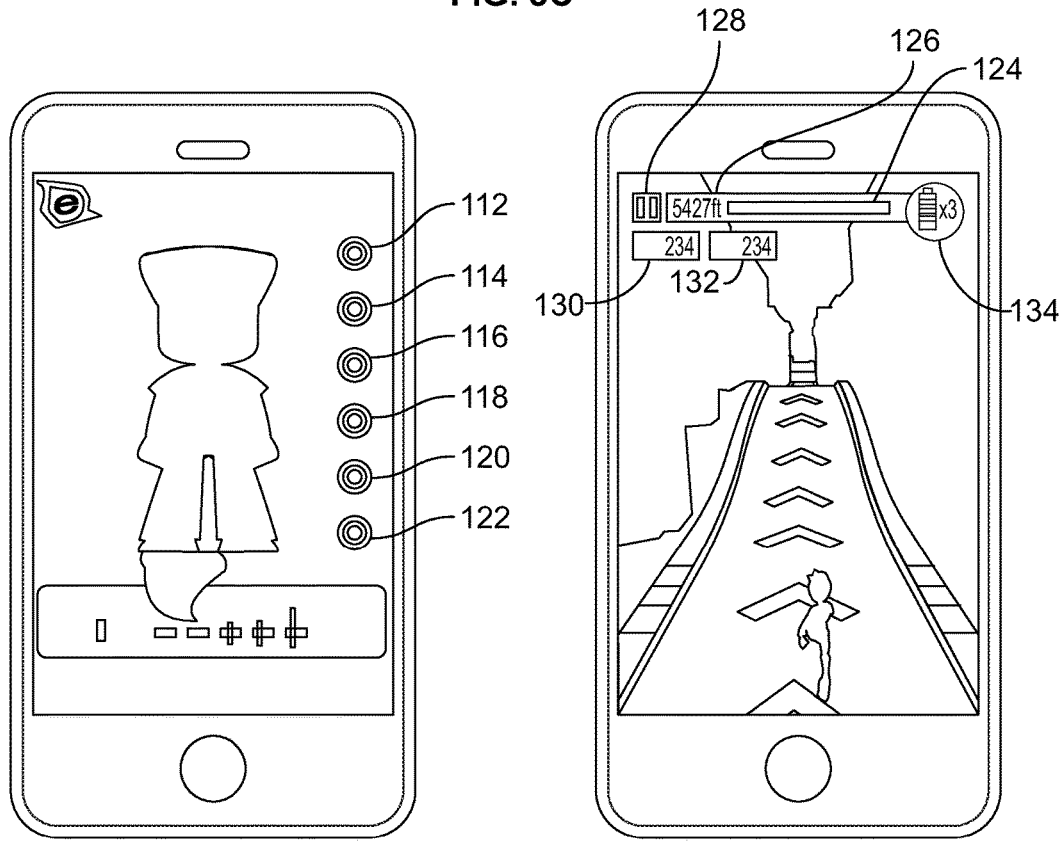
FIG. 6 shows a screen shot of a dashboard used for player interaction with the virtual environment.
FIG. 7 shows an endless running videogame scenario with a heads up display.

FIG. 6 shows a screen shot of a dashboard used for player interaction with the virtual environment. The profile button 112 gives the player access to an avatar creator and editor, a registration portal, an attributes editor, and an animator to customize the game experience. The profile button 112 may be used to register the wristband and set profile variables. The player may choose from many archetype avatars and edit during game play, whether short term or extended. The profile button 112 may be used to disclose the players levels and the associated attributes and to choose and animate virtual environment activities. In the described embodiment, more movement creates more animation.

The tracker board button 114 gives the player access to overall statistics on a daily, weekly and monthly basis, including statistics relating to player's levels, activities, goals set and goals met, online play, competitive standing, times, progress status and upcoming rewards among other trackable information. The missions/training button 116 gives the player access to missions control and a physical training center where the player may choose and control physical and virtual missions to help the player energize and level up the avatar. The vault/shop button 118 provides access to controls for trophies and rewards and how they are showcased, along with a currency converter. By pressing the vault/shop button 118, the player may earn, purchase, pick up, organize, play and show off all the player's achievements and exclusive rewards in a vault. The more one plays, the greater the number of available items.

The energy sync button 120 allows the player to sync all physical items in the game ecosystem that the player has. The player may receive extra points and exclusives from all secondary products purchased. The gaming center button 122 provides a gaming platform link to all gaming apps in the game ecosystem. These apps allow players to upload their favorite avatar as the key game figure. All points generated go back into the game ecosystem.

Several physical objects, such as a basketball and hoop, a soccer ball, a vortex football, a football, or a wristband may be used with the described embodiment, although other objects may be used. Corresponding sport videogame play includes a lot of game content associated with the physical objects. For example, a basketball, a soccer ball, and a football may all be used as the physical object and as certain types of projectiles in the videogame. Projectiles include any toy that can be managed by the throwing mechanics of the character. The throwing mechanics involves three main types of projectile actions: 1) kicking a soccer ball; 2) throwing a basketball; and 3) throwing a football.

Equipping a projectile lets a player equip one type of projectile that the player will carry in the videogame. This allows the player to play the videogame with a representation of the physical toy. The projectile serves many different functions in game, such as destroying obstacles, collecting resources and shooting goals. Using a basketball allows bouncing a ball in the environment, hitting multiple targets with one throw, and a medium rate of fire. Using a football allows a fast linear throw, destruction of targets on impact, and a fast rate of fire. Using a soccer ball allows a very wide trajectory, a kick, and low rate of fire. In order to avoid the presence of a football target when the player is equipped with a basketball, the type of target that appears in the game is directly determined by the type of projectile that the player has equipped.

Sport game play is represented in the videogame by the sport exotic game play section. While running on the track, the player will eventually encounter a portion of the track that is themed to represent one of the three sports that are featured in the game. Just like the projectile targets, the type of projectile that the player has equipped also determines what sport section he will encounter. The sport sections contain more projectile targets than the rest of the game in addition to the challenge of opponent characters. During the sport sections, opponent characters start to appear to challenge the player. These fully animated 3D character athletes each have their own special movement pattern. Basketball players can jump. Soccer players can strafe left and right. Football players charge like trains on a straight line.

FIG. 7 shows an endless running videogame scenario with a heads up display. A game play heads up display (HUD) may be used to display an energy meter 124, distance traveled 126, a pause button 128, the amount of sparks collected during the current run 130, the amount of all-stars collected during the current run 132, and the amount of batteries available 134.

Figure 8:
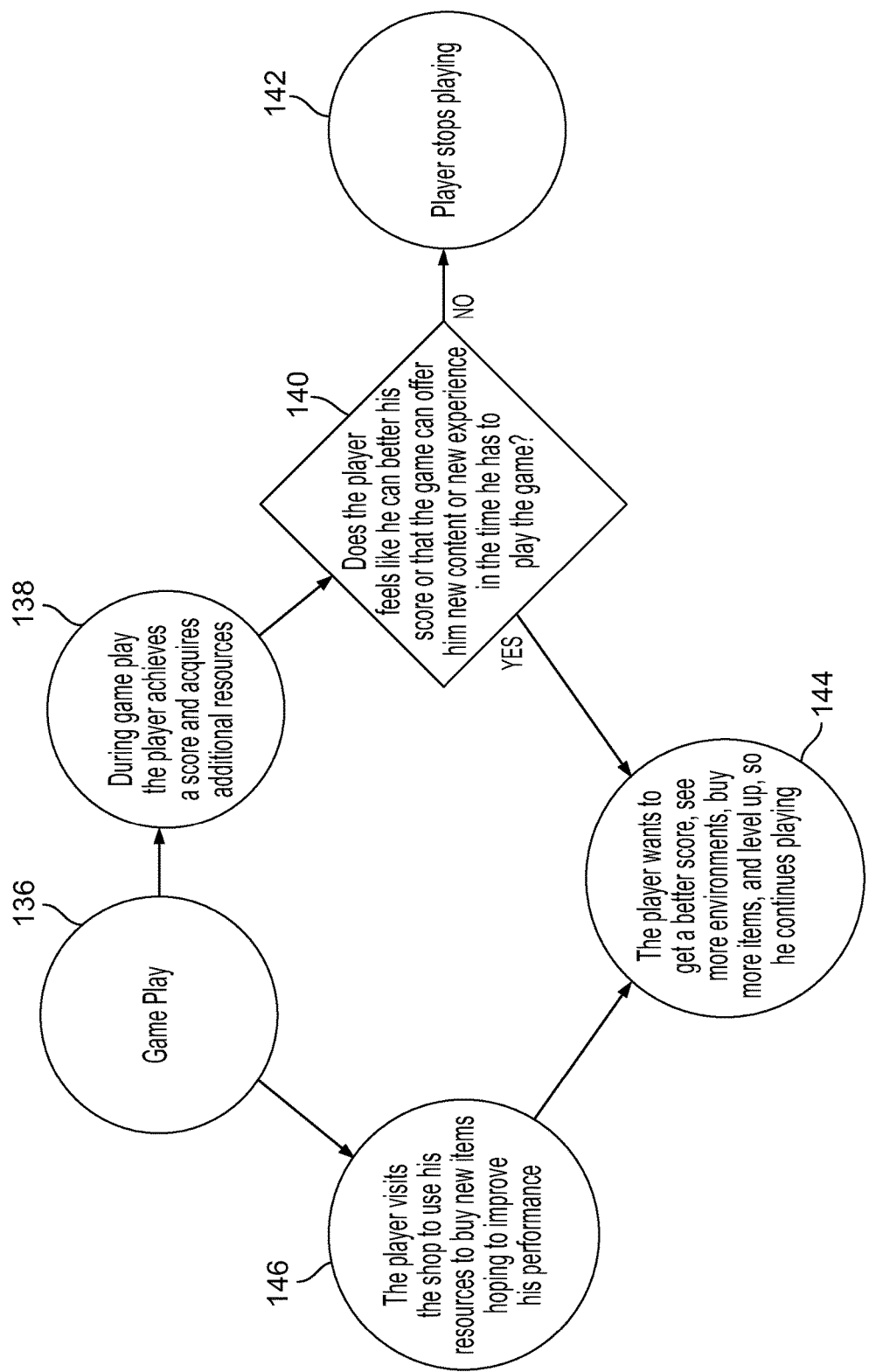
FIG. 8 shows a player motivation loop.

FIG. 8 shows a player motivation loop. What drives players to play a game is the unique experience it can provide. When a player feels like a game can no longer provide new content or that the player cannot improve his score to beat his own high score or someone else's score, he will stop playing the game. The following loop shows the relationship used between the player's perceptions of the game in relation to the game resources he has gathered and the time he has to play the game to keep the player playing. Step 136 shows the player involved in game play. Step 138 explains that during game play, the player achieves a score and acquires additional resources. Step 140 poses the question of whether the player feels like he can better his score or that the game can offer him new content or new experience in the time he has to play the game. If the answer to the question in step 140 is no, the player stops playing in step 142. If the answer to the question in step 140 is yes, step 144 recognizes that the player wants to get a better score, see more environments, buy more items, and level up, so he continues playing. Step 146 shows that if a player has resources during game play, then the player visits the shop to use his resources to buy new items hoping to improve his performance.

Figure 9:
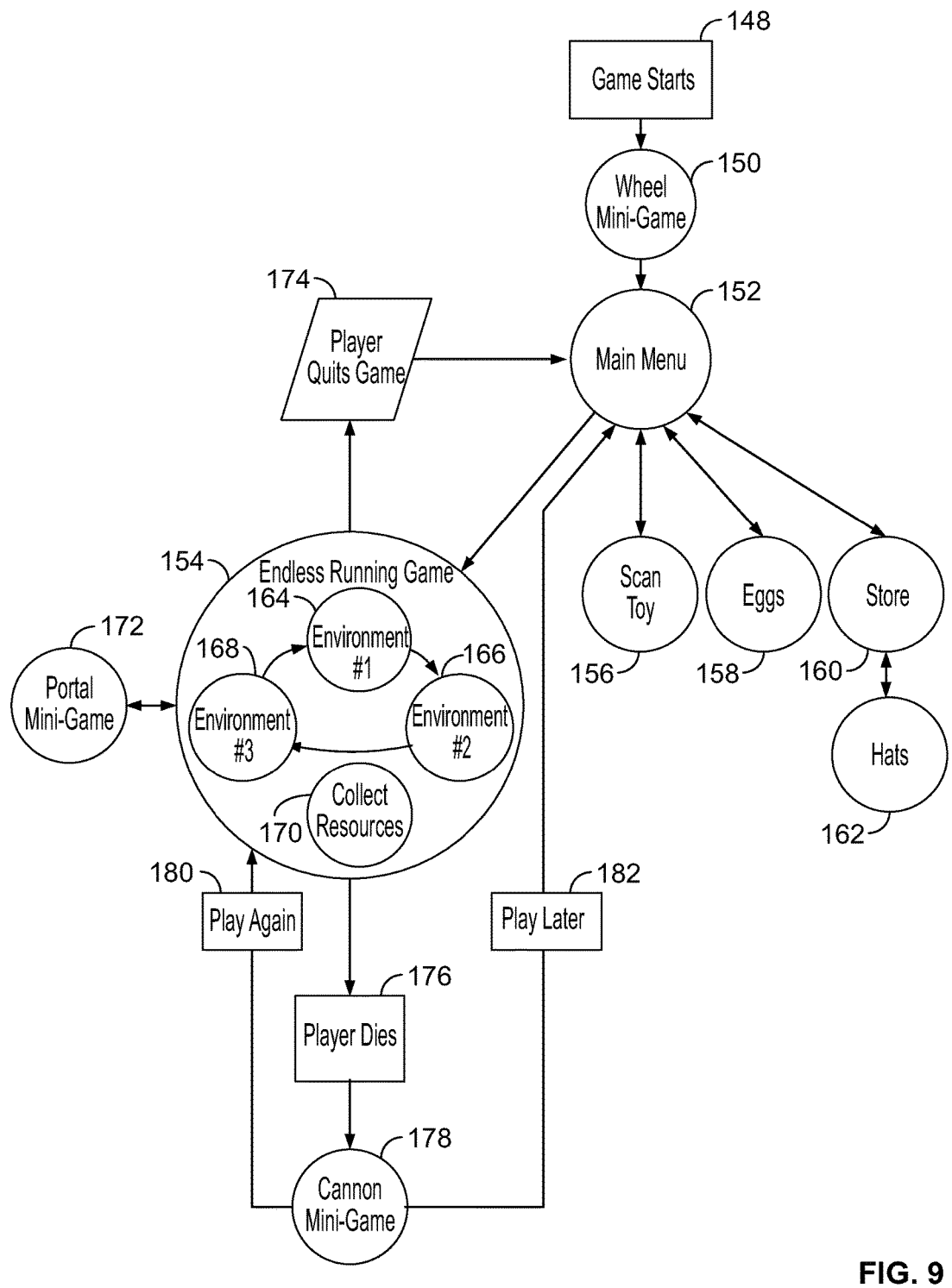
FIG. 9 shows a player progression loop for a particular described embodiment.

FIG. 9 shows a player progression loop for a particular described embodiment. In step 148, the overall game starts. At this time, the player may not have any resources. Thus, in step 150, the player is brought to a traditional wheel-spinning based mini-game, where the player may earn initial resources. Once the player has some resources, in step 152, the player sees the main menu, where the player may spend or further accumulate resources. The player may enter the endless running game in step 154, scan a toy in step 156, purchase virtual eggs to hatch in step 158 or enter the store in step 160, where the player may purchase real items, or virtual items, such as hats in step 162.

Once the player is in the endless running game in step 154, the player may experience several environments, such as environment #1 in step 164, environment #2 in step 166, and environment #3 in step 168. In the different environments, the player will have the opportunity to gather resources and to store them in step 170 for current or later use. Any time during the endless running game in step 154, the player may go to step 172 to play a mini-game or to step 174 to quit. Also during the endless running game in step 154, the player may run out of resources and die in step 176. If the player dies, the player may be transferred to a cannon mini-game in step 178 to earn more resources. The player may then play again immediately in step 180 or play later in step 182.

Energy is the most important resource of the game. Without energy, the player will not experience the game fully. Energy is acquired mainly by syncing the physical toy and wristband with the videogame. Energy also allows player to reach a level where the player may unlock access to batteries.

Figure 10:
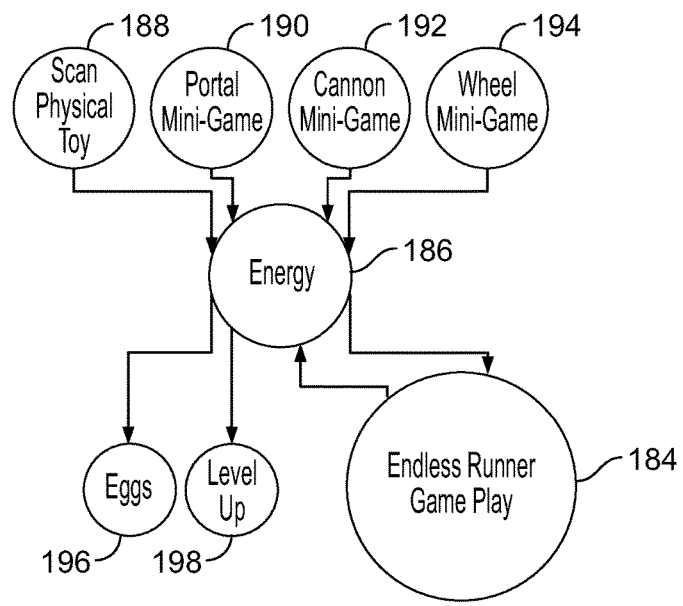
FIG. 10 shows a flow diagram for a videogame energy resource.

FIG. 10 shows a flow diagram for a videogame energy resource. The arrow flow shows that once the player has started the endless runner game play 184, the player will be able to acquire energy 186 and use energy 186. As FIG. 10 shows, energy 186 may also be acquired by scanning a physical toy 188, playing a portal mini-game 190, playing a cannon mini-game 192 or by playing a wheel mini-game

194. FIG. 10 further shows that a player may spend energy 186 by purchasing eggs 196 or by leveling up 198.

Sparks are the second most important resources of the videogame. Sparks are used as a common reward for the player. Sparks will be awarded to the players often. Sparks let players buy accessories, abilities, boosters and batteries within the videogame. There are many ways to acquire and spend Sparks in the game. Sparks are considered soft currency.

Figure 11:
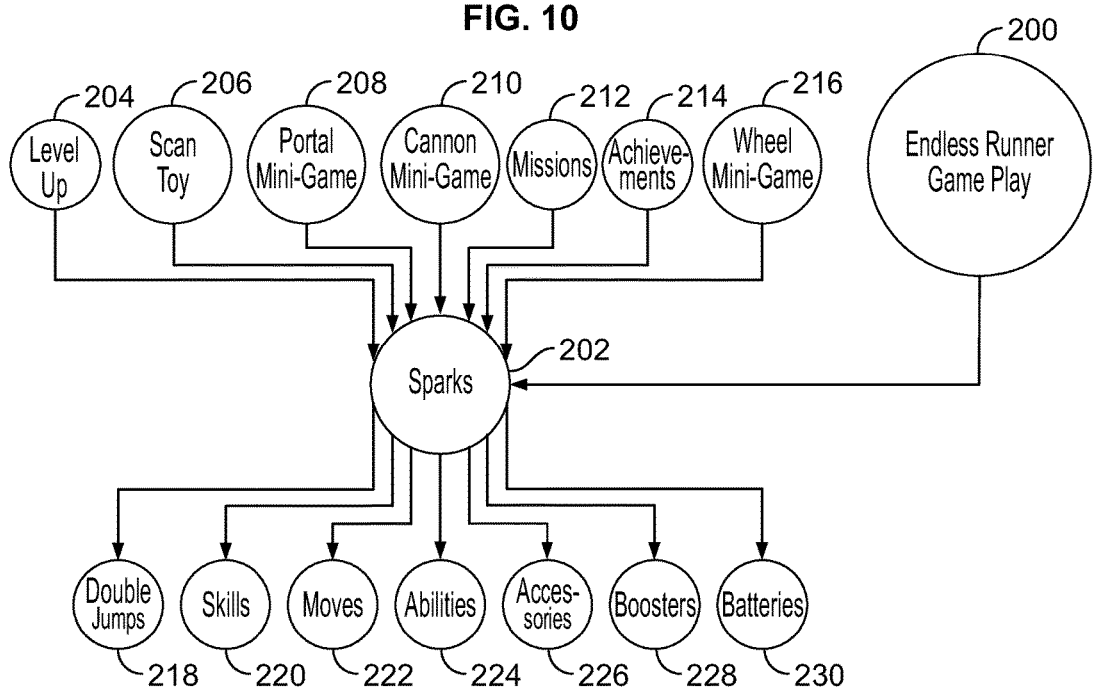
FIG. 11 shows a flow diagram for a videogame spark resource.

FIG. 11 shows a flow diagram for a videogame spark resource. The arrow flow shows that once the player has started the endless runner game play 200, the player will be able to acquire sparks 202 and use sparks 202. As FIG. 11 shows, sparks 202 may also be acquired by leveling up 204, by scanning a physical toy 206, by playing a portal mini-game 208, by playing a cannon mini-game 210, by playing missions 212, by gaining achievements 214 or by playing a wheel mini-game 216. FIG. 11 further shows that a player may spend sparks 202 by purchasing double jumps 218, skills 220, moves 222, abilities 224, accessories 226, boosters 228 and batteries 230.

All-stars are the third most important game resource. All-stars are used as a rare reward for players. The videogame will have many opportunities to reward players with all-stars but will rarely actually award them. When the videogame awards all-stars, it will only award one to three all-stars at a time. Most items that a player may acquire with all-stars will be top tier items with fairly high prices of twenty or more all-stars. Thus, players have an incentive to continue playing the videogame. In the described embodiment, there are many ways to acquire all-stars but only a few ways to spend them. All-stars are considered hard currency.

Figure 12:
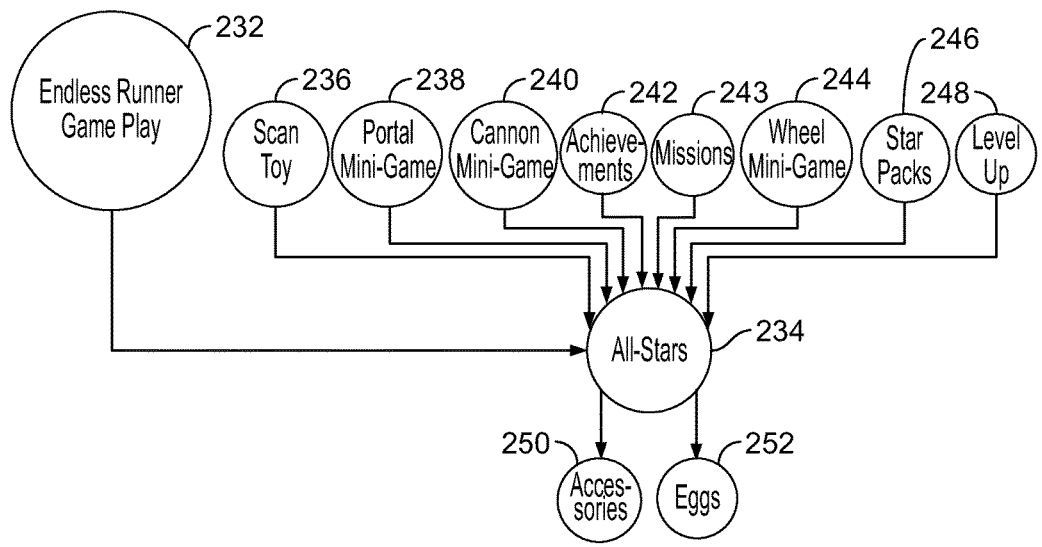
FIG. 12 shows a flow diagram for a videogame all-star resource.

FIG. 12 shows a flow diagram for a videogame all-star resource. The arrow flow shows that once the player has started the endless runner game play 232, the player will be able to acquire all-stars 234 and use all-stars 234. As FIG. 12 shows, all-stars 234 may also be acquired by scanning a physical toy 236, by playing a portal mini-game 238, by playing a cannon mini-game 240, by gaining achievements 242, by playing missions 243, by playing a wheel mini-game 244, by acquiring star packs 246 or by leveling up 248. FIG. 12 further shows that a player may spend all-stars 234 by purchasing accessories 250 or by purchasing virtual eggs 252.

Regarding the fourth resource, investing real money in the game is not necessary to enjoy it but will help speed up progress.

These resources can be acquired by certain methods, also called "wells". These methods include, but are not limited to: 1) scanning Nerf™ devices; 2) collecting resources during videogame play; 3) collecting resources while playing a mini-game; 4) completing challenges; 5) completing achievements; and 6) in-app purchases.

Players can acquire the following game elements, also named "sinks", by spending the acquired resources: 1) accessories; 2) double jump capabilities; 3) various moves; 4) boosters; 5) hats; 6) energy storing batteries; 7) virtual eggs to raise pets; and 8) all-star packs.

In the described embodiments, what resources may be used to purchase each well or sink may be limited. For example, certain items may only be purchased when the videogame is energized. Furthermore, energy may only buy certain wells and certain sinks, while the other currencies may only buy other combinations of wells and sinks.

An energy meter lets the player know how much energy has accumulated. Once a player accumulates a certain amount of energy, the player triggers the power mode. The app may provide audio and/or visual feedback that the player has entered power mode. There are many ways to acquire and to spend energy in the game. In the described embodiment, the player may acquire energy by playing with the physical wristband and toy, by collecting energy tokens during mini-games accessible from the main videogame, and by interacting with various game play ingredients.

By transferring energy to the game and filling the energy meter, the player can trigger "Power mode". This has several effects on the game, including that: 1) the player's character becomes the Power character; 2) sparks becomes visually supercharged and are worth twice their default value; 3) all the menus become lit up and look energized; 4) the Shop icon is in a different state and pulsing, to indicate that some items are now available while the game is in that state; 5) player speed increases by % 150; 6) the player can run through small obstacles; and 7) the energy meter starts to decrease at the rate of 1 unit of energy per 0.1 second. Thus, one full energy meter can sustain an energized game for 10 seconds. When the videogame character transforms to Power mode, the player is shown animation indicating the change.

The application makes the player familiar with integrated physical and virtual play concepts and powered game feature early into the experience. This may be accomplished using a game trailer exposing virtual play in conjunction with real play, the action of scanning products, and normal versus power game modes. Familiarity with the integrated environment is further reinforced by a first welcome pop up window, incentive towards the scan button and brief how to scan tutorial, access to detailed information on every major game menu screens, a very polished "toy to life" cinematic when scanning product, "Power mode activated!" feedback when the game's Energy meter reaches 100%, a gift of a battery item and how to use tutorial after the first game to give a taste of the high roller economy loop, an integrated play reminder in the score screen at the end of every game, and recognition of a long period between play to pop up reminders. In the earliest phases of the experience, more rewards and cheaper unlockable items are distributed to give generous rapid earnings to increase the chances that the player will use the game more.

Described embodiments have tutorials, each with a win and fail outcome and the ability to reset. New tutorials are introduced as the player unlocks things and experiments with new situations. A tutorial can slow down time in order to give the player time to react. Tutorials can happen in-game and through menus. Tutorials exist for core game play, ability upgrades, integrated play and scanning and power modes, although other tutorials may be used for other aspects of the embodiments.

Core videogame play includes various playable characters with various characteristics. When the energy meter hits 100%, the normal kid character transforms into the power kid character, with additional attributes and rewards. The normal kid character has the following characteristics: 1) speed increases over time; 2) may throw projectiles; 3) can run, dash, jump and double jump; 4) can slam; 5) can equip and use item; and 6) can run on walls. Other attributes are possible. The power kid character has the following characteristics: 1) can see and use power game play ingredients; 2) earns double currency for picking up objects; 3) occasionally spawns hard currency; 4) has more powerful projectiles and more powerful slams; 5) can run on water; 6) can break weak obstacles; 7) can use bonus portals; 8) can grind on rails; and 9) can recover from damage faster. Other attributes are possible.

In some embodiments, the basic videogame character actions include running, strafing and jumping and the player may unlock double jumping, target shooting and kicking, free shooting and kicking, dashing, and slamming by smashing a foot to the ground. Other actions are possible. In addition to these basic actions, special actions may be performed when the player interacts with special game play ingredients and may include freefalling, grinding on rails, performing a super-athletic move, and sliding down a slope. Other special actions are possible. Exotic game play controls further include pipe controls where strafing works like a half-pipe, and one may swipe for a full loop gesture. These gestures may also be used for aerial game play. Other gestures are possible.

The videogame character may display many hit reactions, including stumbling while the crumbling path approaches the character and death. Both stumbling and death may be represented in various forms of animation, and other reactions are possible.

The described embodiments have several virtual camera tools. The default game camera is positioned to keep the main character viewable as much as possible while showing the whole width of the track and keeping a good screen portion and focus on the horizon line from where most of the game play appears to the player. The cinematic camera is scripted to showcase the character in an animated cut scene on key moments of the player's performance. By default, the camera does not jump with the character. If the character jumps beyond the safe frame, the camera follows him. Upon touching the ground, the camera moves smoothly back to its default position. Bullet time may be used to slow down the game time scale temporarily. A near death camera may zoom out a little or move as dictated by an animation. Freeze frames are used to enhance particularly powerful actions, such as energizing, transforming energy, and ground slamming on many objects.

In the videogame, low and high roller loops are used. To maximize value and desirability to the integrated play experience, the amount of game features are carefully balanced where content access and progression means are available to the player depending on whether the player scanned a product or not, or if the player is in Power mode or Normal mode.

Figure 13:
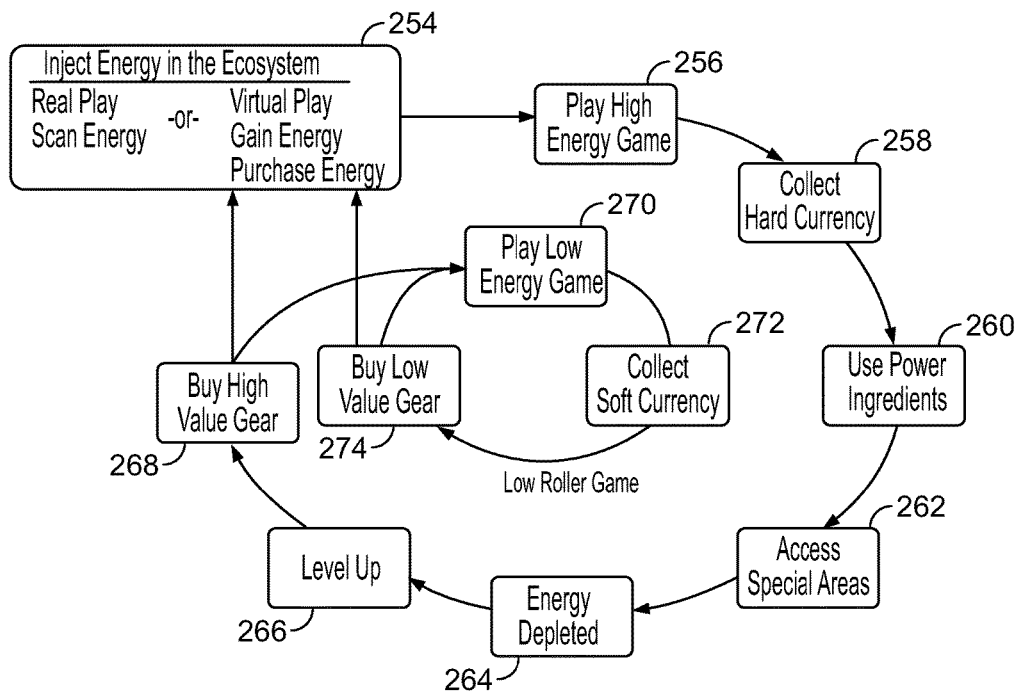
FIG. 13 shows game play roller loops.

FIG. 13 shows game play roller loops. The loops begin in step 254 when energy is injected into the game ecosystem through real play with a physical toy, by scanning physical toys, by virtual play, by gaining energy through means such as promotions, or by purchasing energy. Initially, the player is exposed to the high roller loop by playing a high energy game in step 256 to lure the player into the realm of high roller playing. Because of the high roller play in step 256, the player collects hard currency in step 258, uses power-related game play ingredients in step 260, accesses special areas in step 262 and depletes the energy available for the current run in step 264 but ends up rich from the hard currency collected in step 258. The player can then spend some currency to level up in step 266 and to buy high value gear in step 268. The player may then return to step 254 to inject more energy into the ecosystem and repeat the high roller loop, or the player may begin the low roller loop by playing a low energy game in step 270, where the player will earn soft currency in step 272, buy low value gear in step 274 and either return to step 254 to inject more energy into the ecosystem and follow the high roller loop or follow the low roller loop and return to step 270 to play a low energy game.

Players may also level up in the energy core. The energy core is where all energy acquired by the character of the videogame is collected. Every bit of energy transferred to the game is added to the energy core. The energy core is tied to the leveling up system of the videogame. By leveling up the player is rewarded with soft and hard currency. The energy core is presented on the game result screen, the product scan result screen, a pause menu, and a statistics screen.

Between each run the player can visit the shop where he can buy projectiles, hats, skills, boosters, double jumps, moves and batteries. The shop lists all items separated in categories in a long scrolling list. Each item is represented by its icon, name and price. By tapping on a line, it expands to reveal the item description, its effect and a Buy button. Projectiles, skills, double jumps, moves, hats and batteries are permanent items that once bought by the player will forever stay in its "Inventory". Boosters are consumable.

Projectiles are virtual versions of NERF™ energy toys that can only be bought using real money. Buying projectiles in the shop gives the player the same abilities in-game as if the player has bought the real life toy and has scanned it into the game. A player can change the projectile by visiting a specific menu.

Hats are virtual vanity items and exist in the game to allow a player to be able to minimally "customize" the look of its in-game avatar and increase its "Cool" factor. They have no effect in the game. Player can change the hat they wear by visiting a specific menu.

Skills are game play improvements the player can buy to help perform better in the videogame or to modify the game experience. A player may only use one skill at a time. A player can change the skill they use by visiting a specific menu.

Boosters are consumable items that give a player an advantage in-game. Each booster is designed for a particular situation and can be triggered solely in that situation. For example, a booster may provide extra life immediately after death, or a booster may apply a random multiplier to a player's score during a particular time in game play. Other boosters may include, but not be limited to, random rebates on purchases, a head start in the videogame, extra power from a weapon, etc.

Double jumps are vanity animations that also exist in the game to allow a player to customize the behavior of the avatar. A player can only buy double jumps once the player has bought the "Double jump" move. A player can select one double jump animation that will replace the standard double jump animation. Double jumps have no effect in game.

Moves are special in-game actions that the player can acquire to increase performance. There are five moves that the player can buy, which are double jump, dashing, slamming, target shooting and kicking, and free shooting and kicking. Other moves may be used. Once a move has been acquired by the player this move goes into the player inventory. In the described embodiment, the player can select only one move to use during a run.

Once the player buys an item, a checkmark is added on that item line and its price disappears. This signifies that this item is owned by the player. For boosters that can be acquired more than once, a multiplier will also be displayed on the item line. For example: Life booster X3, signifies that the player has 3 life boosters in is "inventory".

A character menu allows a player to "Equip" what the player wants for the run. A player can only equip one item of each type in the described embodiment. Types of "Items" the player can equip are hats, skills, double jumps, moves, and pets, although this list is not exhaustive. A player selects items by tapping the screen on the mobile device.

Batteries are used to allow the player to store energy beyond what is usable during a run, thus allowing the player to experience a longer run in "Energized mode". In the described embodiment, a player may have up to five batteries, which the player may purchase after reaching certain levels within the videogame, and the player may only purchase batteries using sparks.

Feats are statistics about the player's performance that are kept in the player's profile. The main objective of the feats is to provide the player with a way to evaluate progress towards the completion of achievements so that the player feels like he or she is progressing and to provide a way for the player to compare overall performance with other players. Feats are listed in a "Feat" sub menu in an "Options" menu. "Feats" may include, but are not limited to: 1) longest run distance; 2) total run distance; 3) highest run score; etc.

Achievements are mid-term and long-term goals that the player can achieve to receive rewards. Achievements are listed on one line showing the name, progress and reward. When the player taps on the achievement, its line expands to show the achievement description. Contrary to missions, all achievements can progress at the same time. When an achievement is completed, a notice appears at the top of the screen letting the player know that the player has completed the achievement. The notice gives the name of the achievement followed by the term "Completed". For example, "Super Runner Completed". At that moment, the reward for the achievement is also added to the player's Sparks and All-Stars account. If multiple achievements are completed at the same time, their notice will appear one after the other. Achievements include, but are not limited to: 1) running certain distances; 2) scoring a certain number of points; 3) owning a certain number of physical game-related toys; etc.

Missions are mid-term and long-term goals that the player can complete to receive rewards. In the described embodiment, at launch, the game will offer 40 missions. In the proper menu, missions are listed on one line showing the name, progress and reward. When the player taps on a mission, the line expands to show the mission description. Contrary to achievements, missions only progress when they are activated, e.g. displayed in the mission screen. Once a mission is completed, the player receives the corresponding reward and the mission is shown as "Complete". When a set of three current missions are completed, the system randomly selects three other missions from the remaining missions that have not been completed. A player can skip a mission deemed too difficult by tapping a skip button. It will cost the player the amount of the mission's reward to skip the mission. For example, if a mission has a reward of 500 sparks, it will cost 500 sparks for the player to skip the mission.

To make sure players come back to the game often, retention mechanisms and rewards will be built in the game. There are 3 types of retention mechanisms: 1) short term, to entice return to the game every 3 hours; 2) medium term, to entice return to the game every 6 hours; and 3) long term, to entice return to the game at least once per day. The game will have 3 corresponding retention mechanisms: 1) a wheel of chance mini-game that the player can play once every 3 hours; 2) an egg caring mechanism where the player must take care of a pet egg at least once every 6 hours; and 3) a daily bonus awarded for logging in every 24 hours.

The wheel of chance mini-game is based on the classic mechanism where the player spins a wheel that will randomly stop in front of a prize. The player can spin the wheel by pressing a spin button for free once every 3 hours. If the player wants to spin it more often the player must pay some hard currency to do so. Prizes may be, but are not limited to certain numbers of sparks, boosters, and energy. Extra spins in the described embodiment cost an increasing number of all-stars.

In the Egg Caring Mechanic mini-game, players can acquire virtual eggs and take care of them until they hatch and become a pet. Eggs can be bought in the store. Once the player acquires an egg, the player must take care of it at least once every 6 hours to continue its growth. The player must take care of the egg by transferring energy to it. The egg consumes the energy to feed its growth, and, as long as the egg has energy, it will continue to grow. When the energy count reaches 0 the growth stops. Eggs may have different characteristics to make them look and act differently, different hatch times, and different energy consumption rates. Eggs may provide in-game benefits including, but not limited to, saving a player from falling off the track and wiping the screen of enemies and obstacles. In the described embodiment, a player can take care of only one egg at a time, though multiple eggs are possible. However, players can have multiple pets, or hatched eggs. Pets follow the player during the videogame runs and give the player special attributes and the ability to save the player once from falling to his death.

The daily bonus is awarded once every 24 hours when the player enters the game. The reward increases with each consecutive day that the player plays the game. On the sixth consecutive day, the player gets a random reward selected out of five possible rewards. For each additional consecutive day, the player also gets a random reward. When a random reward is awarded, it cannot be awarded again until all the random rewards have been given. When all random rewards have been awarded, the mechanism is reset and all random rewards can be awarded again. When the player misses a day, the daily bonus reward is reset to zero.

In the described embodiment, the game world is built in several different environments that differ mainly in the aspect of the track, the type of ingredients found on the track, and the background visuals. The environments are designed to serve as the backbone of the game's level design progression. The default environments always chain in the same order and represent the ascension of the player from earth into space, for example. Game play progression continues with crazier track sections and game play ingredients as the player continues to ascent. Additional environments can be unlocked by progressing in the game over mid to long term play.

Figure 14:
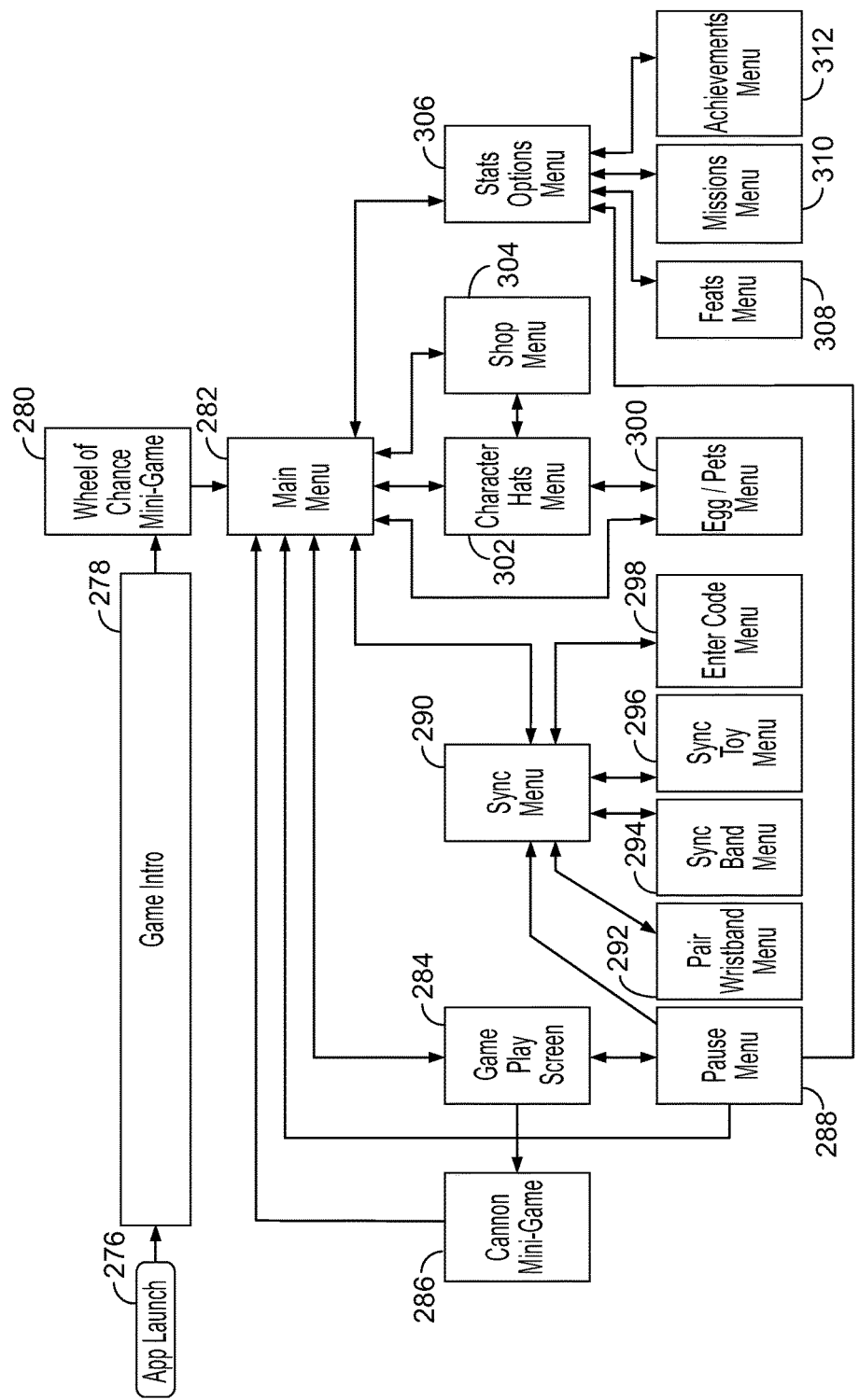
FIG. 14 shows the game play wireframes flowchart for a described embodiment.

FIG. 14 shows the game play wireframes flowchart for a described embodiment. To help understand the overall structure of the game, the flowchart shown in FIG. 14 gives an overview of game menus and how they can be navigated. The described embodiment begins with the app launch 276, followed by a game intro 278 and a wheel of chance mini-game 280 before arriving at the main menu 282. From the main menu 282, the player can reach the game play screen 284, where the player may play the endless running game and either play the cannon mini-game 286 and return to the main menu 282 or go to the pause menu 288. From the pause menu 288, the player may return to the game play screen 284 or proceed to the sync menu 290. The player may also reach the sync menu 290 directly from the main menu 282. Once at the sync menu 290, the player may reach and return from the pair wristband menu 292, the sync wristband menu 294, the sync toy menu 296, the enter code menu 298 and the main menu 282. Also from the main menu 282, the player may reach and return from the egg/pets menu 300, the character hats menu 302, the shop menu 304 and the stats options menu 306. The player may also navigate between the egg/pets menu 300 and the character hats menu 302, and between the character hats menu 302 and the shop menu 304. From the stats options menu 306, the player may navigate to and from the feats menu 308, the missions menu 310 and the achievements menu 312.

The following are starting point examples of energy point accumulation. In described embodiments, the specific rate and amount of energy points accumulated will be calculated from, but not be limited to, the collective use and levels of several factors. 1) The player will earn 10 energy points per hour when the accelerometer of the smart device is in use. The points will be credited all at once at the end of each hour. 2) The player will earn 50 energy points per hour when the accelerometer of the wristband is in use. The points will be credited into the app upon syncing. Points will be prorated for fractional hours. Movement is based on generic movement tracking related to the wristband alone, and not necessarily based on any specific gestures, directed game play, or powered product. Coarse correlation with the intensity of sensor inputs may be reflected in exact energy accumulation. 3) As the app game level increases, so might a multiplier. 4) The player will earn 10 energy points for the completion of a game. Game play examples include timed challenges where a user selects a 5, 10, 15, or 20 second timer and moves as much as possible before the timer ends. The raw result is shown on the wristband LED display. Goal challenges include a game where the user tries to move to increase the energy meter shown in the LED display from empty to full and the raw result is correlated to how quickly this is done. 5) The player will earn 50 energy points for the completion of a game. Game play examples include timed challenges that are the same as for single player games but users connected via the wristband RF link compete to see who has the highest raw result to determine the winner. Goal challenges are the same as for single player games but connected users compete to see who reaches the goal first to determine the winner. A joust game may be played where connected users must keep their respective wristbands still and parallel to the ground and protected from a high impact in order to win. 6) The appropriate multiplier for particular cost levels of powered product may vary. 7) The multiplier may increase as the number of friends increases. 8) During promotional windows of time, a multiplier will be applied to any energy points that are synced into the app. For example, during the World Cup, an additional 4× multiplier may be applied.

In a sample use case scenario based on the above point accumulation algorithm, a player may download and open the app, and while the app is open or in the background, the player moves around with the device for an hour, and earns 10 points. The player will have a total of 10 points. If the player only wears the wristband and moves for an hour, the player will earn 50 points. The player will then have a total of 60 points. If the player plays the app and reaches level 4, the multiplier will be set to 2. The player will still have a total of 60 points. If next, the player only wears the wristband and moves for an hour, the player will earn 100 points (50 points/hour×2). The player now has a total of 160 points.

If the player plays a single player game and finishes, the user will earn 20 points, 10 points for completing the game times the multiplier of 2. The player will have 180 points. If the player syncs the high cost powered product into the app, the multiplier is 4. The player will still have a total of 180 points. Now, if the player only wears the wristband and moves for an hour, the player will earn 400 points (50×2×4). The player will have 580 points.

If the player adds a friend, there is a new multiplier of 2, and the player will have still have 580 points. Then, if the player successfully completes a multiplayer game, the player will get another 800 points (50×2×4×2). The player will have 1380 points.

Now, if the player plays for an hour during a promotional time period with a multiplier of 4 at 50 points per hour, the player will earn 1600 points (50×2×4×2×4). The player will now have 2980 points. With so many points, the player may exchange 1000 energy points in the app for digital power-up, such as zero-gravity shoes. The player will now have 1980 points. From the foregoing use case scenario, one can experience the game play of a described embodiment.

Another example of multiplayer game play is a challenge to score the most energy points in a set amount of time. Each player will have x number of seconds to move and score energy points. Once time runs out, the amount that each player scored will be compared with the other players and the points will be distributed based on ranking.

Another example of multiplayer game play is a challenge to score a set amount of energy points before your competitors do. Each player will then move until the first one hits the set amount of energy to win the game. This continues until only one player left has not hit the targeted amount. The players then sync with the app and points are distributed based on each players finish order. This game could be played as individuals or in teams.

Game play in the described embodiments may involve several game play stories. The following shows six examples of some game play stories that may be used.

In the first game story, the user launches the app and is greeted into the experience when the main character waves at him. Initially, the "Energy" meter is red indicating that it is empty. The player is presented with and intrigued by a glowing "Scan" button and how to instructions for integrated play. Following instructions and/or a scan, the player returns to a home page and presses a "Run!" button. The Nerf or Nothin' event described above begins as the background starts deconstructing itself and the game character jumps forward to start running. The virtual camera view turns and starts following the running character. During the initial run, the player is presented basic tutorials with failures turned off temporarily. As a reward for finishing the tutorial, the player begins a very exciting and rewarding sequence with a huge jump to begin full game play. During the beginning of the game play, the game spawns bonus sequences to make starting a new game is rewarding. The bonus sequences are introduced isolated from other game play to focus the player's attention on learning. At the start, the player is not equipped with paraphernalia or skill and can only perform on quarter-pipes, trampolines and obstacle courses. When the player finishes the first game, a message appears to congratulate the player and to offer a few boosters to help start the next game story.

In the second game story, the player learns through the first syncing and energy combination. After the game with the first story, the player has completed the first game and has used up all available energy. The energy meter displays empty energy reserves. A finger points at the meter to entice the player to tap it. The player taps on the empty energy meter and is presented with information about the energy in the game, such as the benefit of having an energized game and how to replenish his energy meter. The videogame suggests that the player plays with a Nerf™ band and/or toy and return later to transfer new energy to the videogame. The player then closes this tutorial and notices that a finger appears on a "Sync" button in the game main menu. The player then taps the "Sync" button and is presented with a message asking if the player has charged up the wristband or toy and is ready to sync. The message explains that the player should only continue adding energy to the videogame if the wristband or toys are fully energized.

If the player has not energized the physical toy and the wristband, the player plays with the physical toy and the wristband until they are fully energized. The player then returns to the videogame with a charged wristband and a toy to open the videogame. The player then notices that the "Pair band" button is pulsing, so the player taps on the "Pair band" button. The videogame then asks the player to press the "Broadcast button" on his wristband while the videogame looks for a band to pair with Bluetooth or some other communications protocol. The videogame finds the band and pairs it with the game. The videogame tells the player that the band is full and that the player should transfer energy from the band to the videogame. The player then taps the "Sync" button and is presented with a message asking if the player has charged the band or toy and telling the player that he or she may only continue if the band or toys are charged.

If the player has energized the physical toys, the player must tap the "continue" button. The player is then presented with a message to tap the "SYNC Band" button to sync a Nerf™ wristband or to tap the "Sync Toy" to sync a Nerf™ toy. The player taps the "Sync Band" button.

The videogame then asks the player to press the "Broadcast button" on the wristband. The videogame finds the band and starts transferring the energy in the game. The energy meter increases accordingly. Because the band was full, 100 energy units transfer to the videogame. During the initial sync, 1000 soft currency units and five hard currency units are also given to the player, where "soft" and "hard" represent two types of currency.

Once the first energy transfer is complete, a notice appears instructing the player to sync another device within the next minute to get an energy combination. If the player wishes to do so, the player taps on "continue", returns to the sync screen taps on the "Sync Toy" button. The videogame accesses the device camera and asks the player to position his device under the camera and press the energy button on the toy. When the player presses the button, the light on the toy flickers to activate the energy transfer. Next, the energy of the game increases and the light on the toy goes dark because the toy is "empty". Because this second sync was within 1 minute of the first one, the player is rewarded with more energy, a certain amount of soft currency and a certain amount of hard currency.

After this sync and transfer, the player's energy meter is full and the player may return to the videogame. In this example, if the player transferred more than a certain amount of energy, the player will gain a level and he will be at level 2. As a reward for reaching level 2, the player gets access to the first battery and a certain number of sparks.

In the third game story, the player has just completed the first sync and energy combination and now has a full energy meter. The player proceeds back to the videogame by exiting the "Sync" menu and returning to the main menu. At the main menu, the player faces a new game interface that appears different. The player's character is now in its "energized" form and the environment has an energized look. In this energized state, the player may also purchase special objects in the store. Once the player taps the "Play" button, the player starts an energized run. In the "energized" game, the player has access to special powers. For example, the player may run on water, use the physical toy as if it had super powers, and break weak obstacles. Additionally, in the third game story, in-game sparks have a doubled value.

In the fourth game story, the player enters a code within the videogame to get an in game virtual toy.

Energy combinations are also available in described embodiments. When a player scans multiple toys/bands within 1 minute of each other, the player gets additional energy and sparks and increases the chances of getting all-stars. The combination is represented on screen to let the player know he made an energy combination. For each combination, the player gets bonus sparks and increases his chances of getting an all-star. To avoid too much energy accumulation, the videogame limits the rate of energy accumulation through combinations.

In the fifth game story, the player has charged up the physical wristband and two physical toys and is ready to transfer from the wristband and the toys to the videogame. First, the player taps the "Sync button" and the selects the "Sync Band" button. Next, the player presses the "broadcast button" on the wristband. The videogame finds the wristband and transfers the energy from the band to the videogame, increasing the videogame's energy by a known amount. Then, within the next minute, if the player syncs a charged basketball toy, the player will get a further known amount of energy and a known amount of sparks. In the described embodiment, because the player has completed a second sync of a combination of physical toys, the player will get a known amount of additional energy and a known amount of additional sparks. At this point, the player will have a 15% chance of being rewarded with additional all-stars.

Encouraged by the rewards for transferring energy from the combination of the wristband and the basketball, the player may transfer the energy from a charged football within one minute for even more energy and more sparks. Because the player transferred from the football within one minute, and the combination transferred includes three physical toy items, the rewards are even bigger. For example, the player will get more than three times the energy and sparks given for a single transfer and have a 20% chance to earn an all-star.

In the sixth game story, the player acquires a battery. In this story, the player has created an energy combination that pushes his energy over the allowed limit of an active videogame. By doing this, the videogame triggers a notice that will teach the player about batteries. The player sees the notice about the surplus units of energy and that the player must acquire a battery to store the additional units. Otherwise the player will lose surplus energy. The notice displays a "Buy battery" button. The player then taps the "Buy battery" button and opens a shop menu at the batteries section. Because the player has reached level 2, the first battery has been unlocked. The player may tap on the first battery buy button and acquire the battery. The player may notice that other shown batteries have a locked notice on them. If the player taps on the second battery, a notice appears telling the player that the battery will be available to buy once the player has reached level 4.

While the present inventions have been illustrated by a description of various embodiments and while these embodiments have been set forth in considerable detail, it is intended that the scope of the inventions be defined by the appended claims. It will be appreciated by those skilled in the art that modifications to the foregoing preferred embodiments may be made in various aspects. It is deemed that the spirit and scope of the inventions encompass such variations to be preferred embodiments as would be apparent to one of ordinary skill in the art and familiar with the teachings of the present application.

What is claimed is:

1. A gaming system for integrated computer-related and physical game play interactions comprising:
   a physical game piece comprising:
      a motion detector that measures motion quantity based on a pattern of an user input;
      a signal emitter in communication with the motion detector and configured to emit one or more signals wherein each signal relates to a measured motion quantity; and
      an actuator coupled to the signal emitter and configured to actuate the signal emitter; and
   an electronic device comprising:
      a smart phone or a tablet computer;
      a receiver configured to receive signals emitted from the signal emitter;
      a user input interface; and
      a game application stored on the smart phone or tablet computer comprising:
         an accumulator for the pattern of user input;
         a first program module stored on the smart phone or tablet computer with the game application responsive to the user input interface and in communication with the accumulator that receives user input based on the pattern of user input; and
      a second program module stored on the smart phone or tablet computer with the game application in communication with the receiver that inputs the signals emitted from the signal emitter.

2. The gaming system recited in claim 1, the game application further comprising:
   the first program module further comprising a plurality of sequentially accessible gaming program modules wherein a game player may accumulate a game tally and with respectively sequential levels of increasing difficulty; and
   a multiplier program module in communication with the first program module and the second program module and the accumulator that receives tally data from the first program module and the second program module and multiplies one or more of the difficulty level and the tally data by a predetermined multiple based on the quantity and pattern of input from the first program module and the second program module;
   the accumulator further in communication only with the multiplier program module.

3. The gaming system recited in claim 2 further comprising:
   the receiver comprising a camera; and
   the second program module further configured to receive a scanned code from the camera and to send a predetermined pattern of input to the multiplier program module.

4. The gaming system recited in claim 1 further comprising:
   the signal emitter comprising one of one or more light-emitting diodes and a transmitter that transmits non-visible electronic signals;
   the actuator comprising a button that a game player presses to actuate; and
   the receiver comprising a camera.

5. The gaming system recited in claim 1 wherein the one or more signals emitted by the signal emitter each cover a range of measured motion quantity.

6. The gaming system recited in claim 1 wherein the signal emitter sets the measured motion quantity to zero upon actuation when the measured motion quantity has reached a defined amount.

7. The gaming system recited in claim 1 further comprising a currency redemption program module in communication with the accumulator and the user input interface that receives input from the user input interface, that allows the player to make purchases of virtual resources and tangible products and that directs the accumulator to adjust the tallies based on the pattern of user input.

8. The gaming system recited in claim 7 wherein the currency redemption program module requires the player to make a purchase when the one or more of the tallies reaches a predefined amount.

9. The gaming system recited in claim 1 further comprising:
   the electronic device further comprising a second signal emitter configured to emit signals related to measured motion quantity; and
   a plurality of physical game pieces, each physical game piece further comprising a second receiver configured to receive signals related to measured motion quantity from other game pieces and from the game application, wherein the second receiver is in communication with the motion detector and wherein the motion detector further measures motion quantity based on the signals received in the second receiver.

10. The gaming system recited in claim 1 further comprising:
    one or both of the first program module configured to accept user input defining the physical game piece used and the second program module configured to accept input defining the physical game piece used; and
    a virtual character related to the physical game piece used as a character in the game application.

11. The gaming system recited in claim 10 further comprising the game application configured to use virtual energy to power the virtual character and to use an amount of virtual energy therewith.

12. The gaming system recited in claim 1 further comprising a network with a network access interface configured to store player account information on a server and to allow access to the network from the web and from other smart devices to show the player's game accomplishments and to compare the player's game accomplishments with game accomplishments of one or more other players.

13. A gaming system for integrated computer-related and physical game play interactions comprising:
    a physical game piece comprising:
       a motion detector that measures motion quantity based on a pattern of an user input;
       a signal emitter in communication with the motion detector and configured to emit one or more signals wherein each signal relates to a measured motion quantity; and
       an actuator coupled to the signal emitter and configured to actuate the signal emitter wherein the signal emitter sets the measured motion quantity to zero upon actuation when the measured motion quantity has reached a defined amount; and
    an electronic device comprising:
       a smart phone or a tablet computer;
       a receiver configured to receive signals emitted from the signal emitter;
       a user input interface; and a game application stored on the smart phone or tablet computer comprising:

an accumulator for the pattern of user input;

a first program module stored on the smart phone or tablet computer with the game application responsive to the user input interface and in communication with the accumulator that receives user input based on the pattern of user input and comprising a plurality of sequentially accessible gaming program modules with levels of increasing difficulty;

a second program module stored on the smart phone or tablet computer with the game application in communication with the receiver that inputs the signals emitted from the signal emitter; and a multiplier program module stored on the smart phone or tablet computer with the game application in communication with the first program module and the second program module and the accumulator, and which multiplies the pattern of user input based on the difficulty level with a predetermined multiple, the accumulator being in communication with the multiplier program module.

14. The gaming system recited in claim 13 further comprising:

the receiver comprising a camera; and the second program module further configured to receive a scanned code from the camera and to send a predetermined pattern of input to the multiplier program module.

15. The gaming system recited in claim 13 further comprising:

the signal emitter comprising one of one or more light-emitting diodes and a transmitter that transmits non-visible electronic signals wherein the one or more signals emitted by the signal emitter each cover a range of measured motion quantity;

the actuator comprising a button that a game player presses to actuate; and the receiver comprising a camera.

16. The gaming system recited in claim 13 further comprising a currency redemption program module in communication with the accumulator and the user input interface that receives input from the user input interface, that allows the player to make purchases of virtual resources and tangible products, that directs the accumulator to adjust based on the pattern of user input, and that requires the player to make a purchase when the accumulator tally reaches a predefined amount.

17. The gaming system recited in claim 13 further comprising:

one or both of the first program module configured to accept user input defining the physical game piece used and the second program module configured to accept input defining the physical game piece used;

a virtual character related to the physical game piece used as a character in the game application;

and the game application configured to use virtual energy to power the virtual character.

18. The gaming system recited in claim 13 further comprising:

the electronic device further comprising a second signal emitter configured to emit signals related to measured motion quantity; and a plurality of physical game pieces, each physical game piece further comprising a second receiver configured to receive signals related to measured motion quantity from other game pieces and from the game application, wherein the second receiver is in communication with the motion detector and wherein the motion detector further measures motion quantity based on the signals received in the second receiver.

19. The gaming system recited in claim 13 further comprising a network with a network access interface configured to store player account information on a server and to allow access to the network from the web and from other smart devices to show the player's game accomplishments and to compare the player's game accomplishments with game accomplishments of one or more other players.

20. A gaming method of integrated computer-related and physical game play interactions comprising:

providing a physical game piece comprising:

measuring motion quantity using a motion detector;

emitting one or more signals wherein each signal relates to a measured motion quantity using a signal emitter in communication with the motion detector; and actuating the signal emitter using an actuator coupled to the signal emitter; and providing an electronic device comprising a smart phone or a tablet computer:

receiving signals emitted from the signal emitter using a receiver;

providing user input using a user input interface; and providing a game application stored on the smart phone or tablet computer comprising:

tallying based on a pattern of an user input using an accumulator;

providing a first program module stored on the smart phone or tablet computer with the game application responsive to the user input interface and in communication with the accumulator that receives user input based on the pattern of user input; and providing a second program module stored on the smart phone or tablet computer with the game application in communication with the receiver that inputs the signals emitted from the signal emitter.

* * * * *